(12) United States Patent
Krein

(10) Patent No.: US 11,231,335 B2
(45) Date of Patent: Jan. 25, 2022

(54) CALIBRATION DEVICE AND PROCESS

(71) Applicant: Luxembourg Institute of Science and Technology (LIST), Belvaux (LU)

(72) Inventor: Andreas Krein, Trierweiler (DE)

(73) Assignee: LUXEMBOURG INSTITUTE OF SCIENCE AND TECHNOLOGY (LIST), Belvaux (LU)

(*) Notice: Subject to any disclaimer, the term of this patent is extended or adjusted under 35 U.S.C. 154(b) by 46 days.

(21) Appl. No.: 16/647,103

(22) PCT Filed: Sep. 3, 2018

(86) PCT No.: PCT/EP2018/073566
§ 371 (c)(1),
(2) Date: Mar. 13, 2020

(87) PCT Pub. No.: WO2019/052840
PCT Pub. Date: Mar. 21, 2019

(65) Prior Publication Data
US 2020/0278267 A1    Sep. 3, 2020

(30) Foreign Application Priority Data

Sep. 15, 2017 (LU) .................................. 100447

(51) Int. Cl.
*G01L 5/00* (2006.01)
*G01G 19/42* (2006.01)
*G01G 23/10* (2006.01)

(52) U.S. Cl.
CPC ............ *G01L 5/0052* (2013.01); *G01G 19/42* (2013.01); *G01G 23/10* (2013.01)

(58) Field of Classification Search
CPC ....... G01L 5/0052; G01G 19/42; G01G 23/10
(Continued)

(56) References Cited

U.S. PATENT DOCUMENTS

| 7,222,515 | B2 * | 5/2007 | Hatanaka | G01N 3/303 73/12.01 |
| 7,278,290 | B1 * | 10/2007 | Hughes | C09K 9/00 264/103 |
| 2020/0278267 | A1 * | 9/2020 | Krein | G01L 25/00 |

FOREIGN PATENT DOCUMENTS

| GB | 1349248 A | * | 4/1974 | ............... G01N 3/30 |
| GB | 1349248 A | | 4/1974 | |

OTHER PUBLICATIONS

International Search Report issued in connection with PCT/EP2018/073566 dated Oct. 22, 2018.
(Continued)

*Primary Examiner* — Nathaniel T Woodward
(74) *Attorney, Agent, or Firm* — Steven M. Shape; Dennemeyer & Associates, LLC

(57) ABSTRACT

The present invention relates to a calibration device (4) comprising: —at least one impact plate (5), characterized in that the device (4) also comprises: —at least one first sensor (1) embedded into a first moving object (3A), said first sensor (1) measuring the way, velocity, form of movement and impact strength directly in the first moving object (3A) hitting the impact plate (5), —at least one second moving object (3B), —at least a first radio-frequency identification transmitter with antenna (1A) embedded into the first sensor (1), —at least one second sensor (2A,2B,2C) attached directly underneath the plate (5) for determining characteristics of the first moving object (3A), when hitting the impact plate (5), —at least one first means (6) for receiving first data provided by the first sensor (1), before and while hitting the impact plate (5), and for receiving second data provided by the second sensor (2A,2B,2C), when hitting the impact plate (5), —at least a second radio-frequency identification transmitter with antenna (6A) embedded into the first means (6), —the first sensor (1) and the second sensor
(Continued)

(2A,2B,2C) are interacting with the first means (6), —at least one second means (7) for analysing the data provided by the first sensor (1) and by the second sensor (2A,2B,2C) and for calibrating the second sensor (2A,2B,2C) located on the impact plate (5) and determining the characteristics of at least one second moving object (3B) when hitting the impact plate (5), —a high speed camera (20) is configured to assess parameters due to the impacts of the first and second moving objects on the impact plate (5).

15 Claims, 32 Drawing Sheets

(58) Field of Classification Search
USPC ........................................................ 73/12.01
See application file for complete search history.

(56) References Cited

OTHER PUBLICATIONS

Julein Barriere et al, "An advanced signal processing technique for deriving grain size information of bedload transport from impact plate vibration measurements: A signal processing technique for deriving grain size of bedload," Earth Surface Processes and Landforms, vol. 40, No. 7, Jan. 20, 2015, pp. 913-924.

* cited by examiner

FIG.20     FIG.21     FIG.22
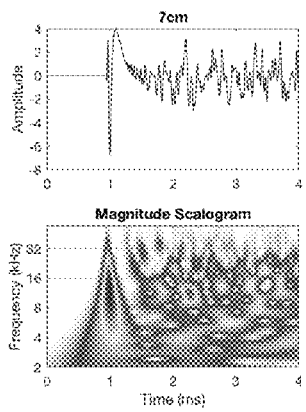
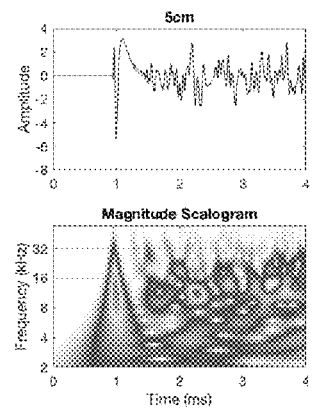
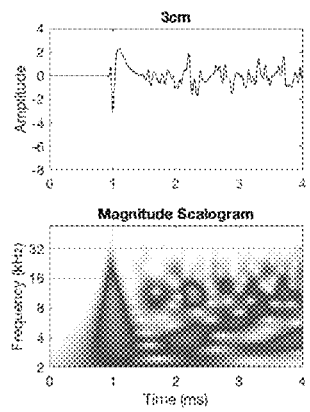
FIG.23     FIG.24     FIG.25
FIG.26
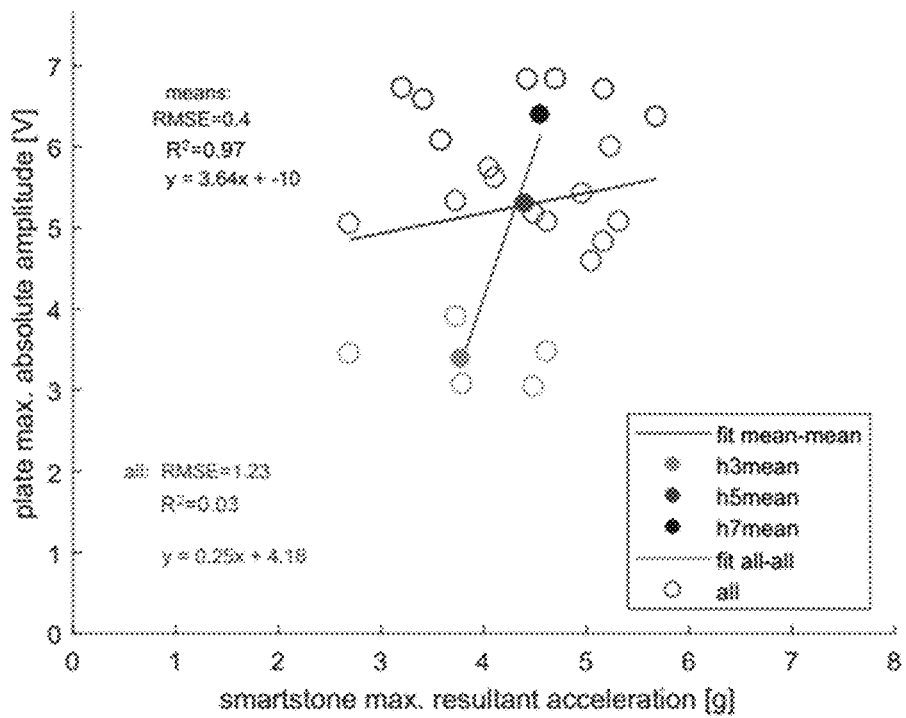

FIG.30
FIG.31
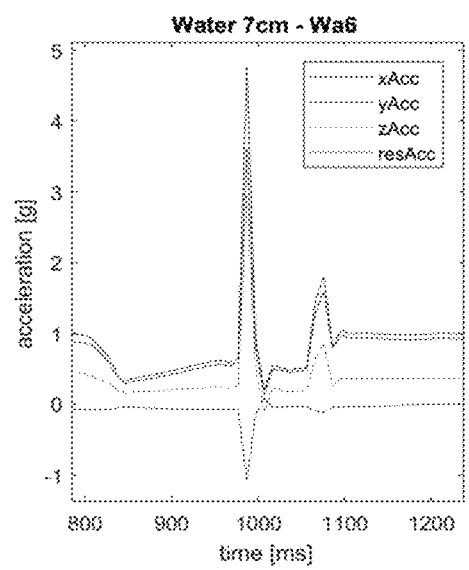
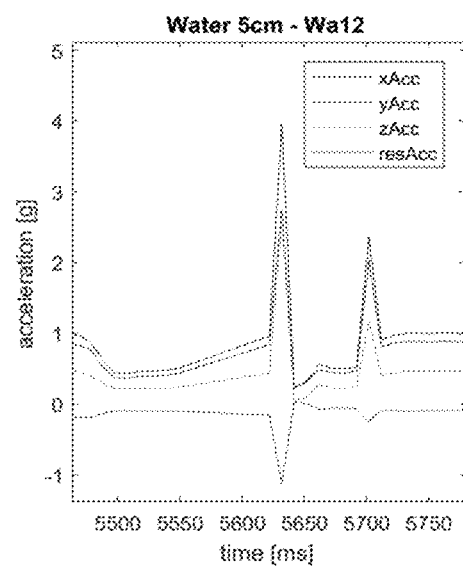
FIG.32
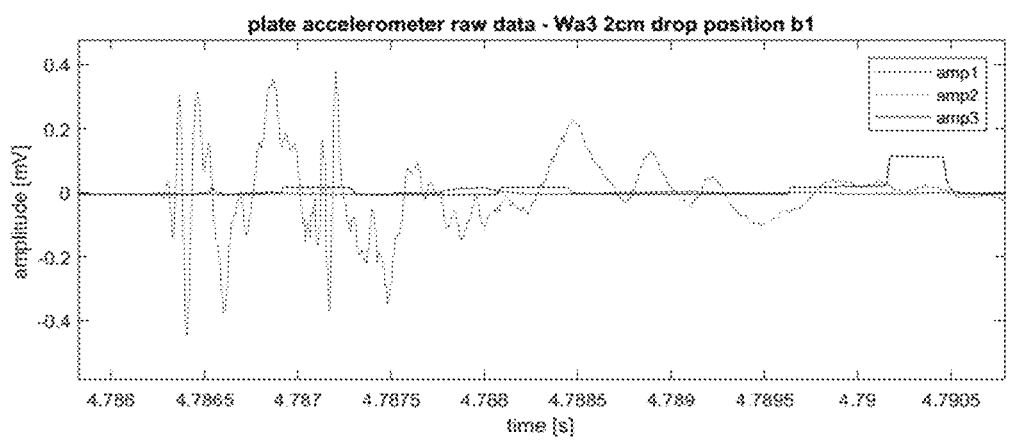

FIG.58
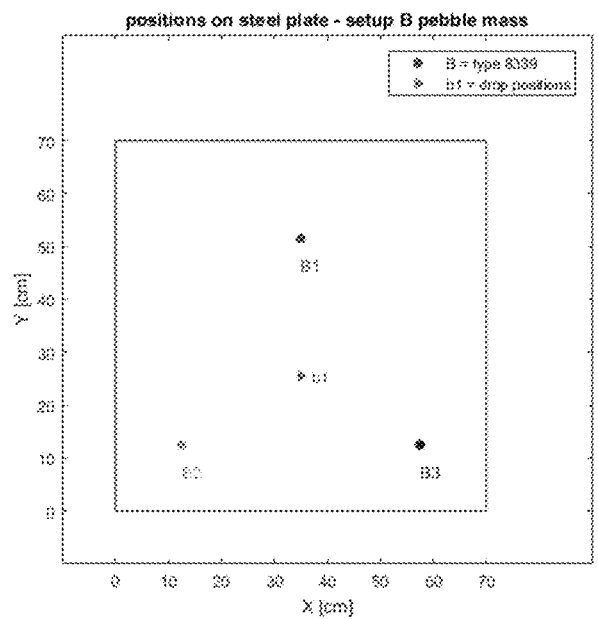
FIG.59  FIG.60  FIG.61
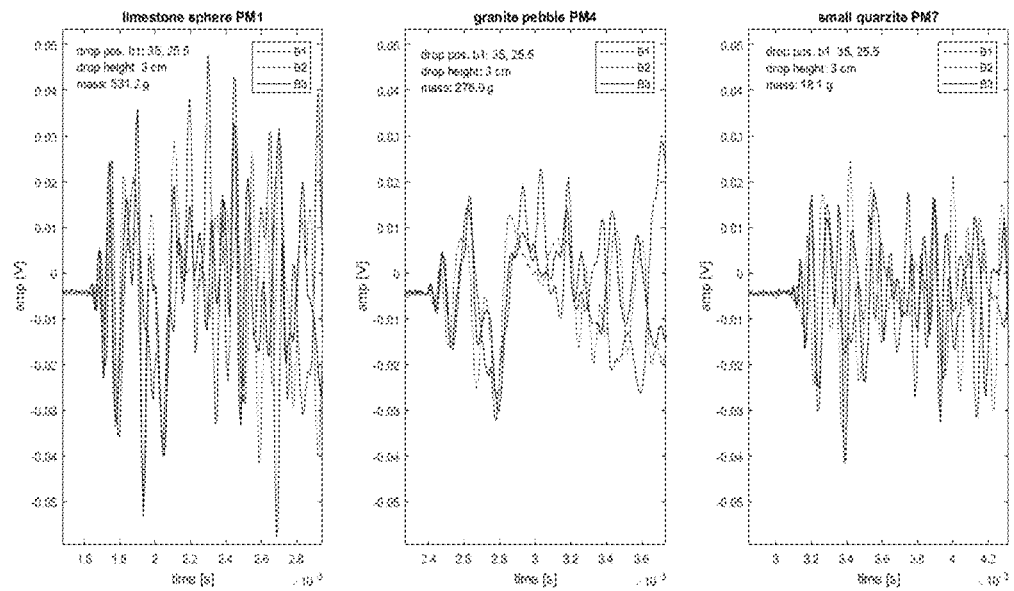

FIG. 68
FIG. 69
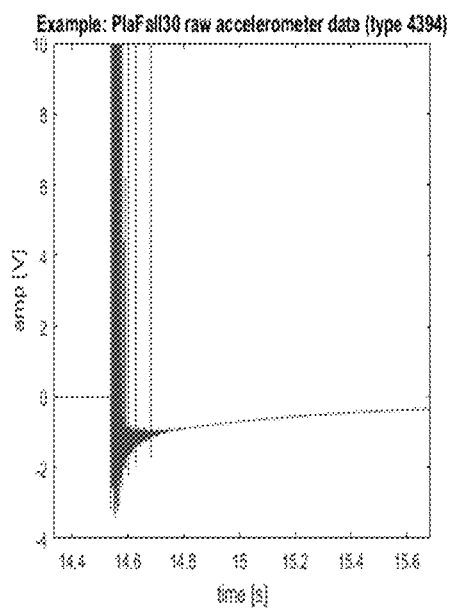
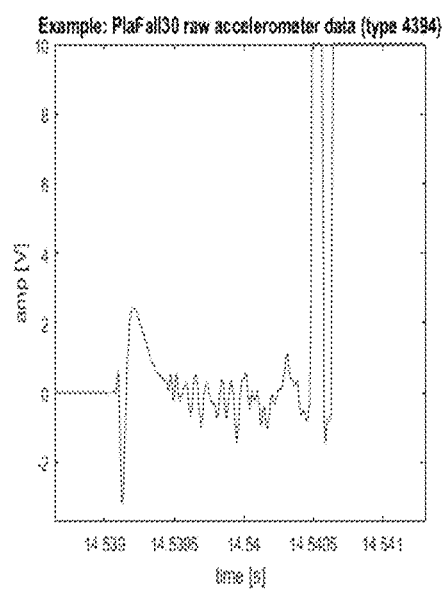
FIG. 70
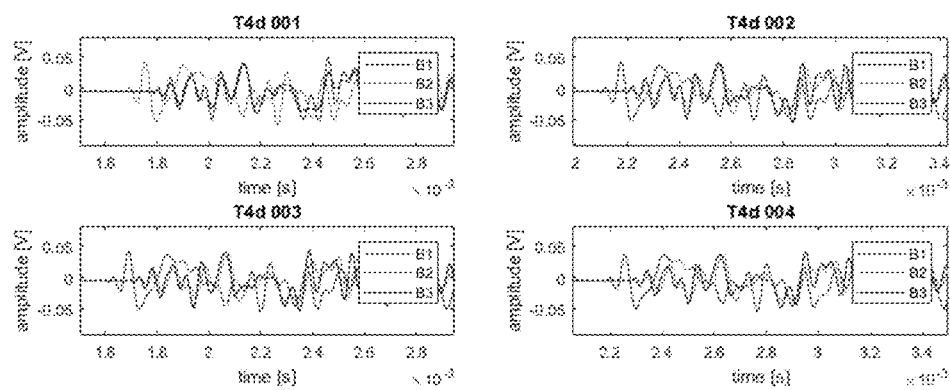

FIG.73
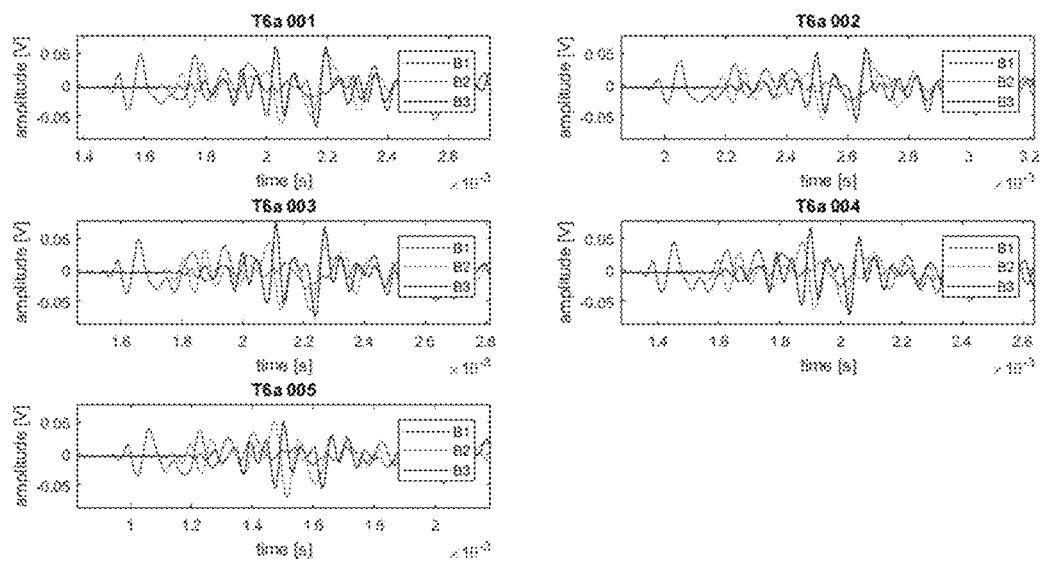
FIG.74
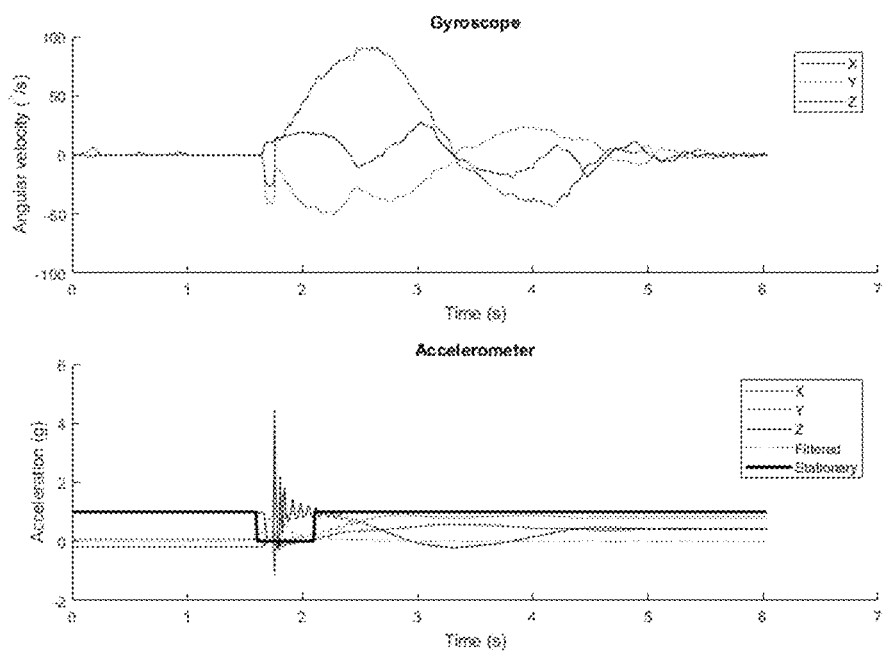
FIG.75

CALIBRATION DEVICE AND PROCESS

The present invention concerns the field of calibration of sensors.

PRIOR ART DOCUMENTATIONS

The known prior arts comprise four documents:

GB 1349248 (D1) entitled measurement of impact relates to an apparatus for measuring repetitive impact comprising an anvil 1 on which the blows are made, the head 3 forming a capacitor with a plate 5 this capacitor being charged through an circuit 12, 13 giving an output A comprising a decaying wave train whose first swing is indicative of the size of the impact a demodulating circuit 15 of diode and a second larger capacitor giving an output B which may be fed to any of a number of measuring circuits. It may be connected to a rate-meter 17 (which may be a tachometer or counter); it may also be fed to a further diode and capacitor 18 giving a very slowly decaying output C which can be read on a meter 19 providing a value for the pick magnitude. The signal B may also be fed to an amplitude discriminating circuit 23 with a variable level E which may feed a rate meter 26, or counter 27 to determine the number of blows above any given level calibration may be made by dropping known weight from a known height. The device may be used to compare repetitive impact tools.

A first article (D2) has been written by Dr. Andreas Krein (the inventor of the present invention) and Julien Barriére et al., it has been published on 20 Jan. 2015 and is entitled "An advanced signal processing technique for deriving grain size information of bedload transport from impact plate vibration measurements", pages 913-924, Earth Surface Processes and Landforms 40. This first article (D2) relates to a reliable characterization of bedload transport in a gravel-bed river during multiple laboratory flume experiments and during a flood event to gauge the engineering issues related to the dynamics of sediment transport in rivers using an impact plate where a piezoelectric hydrophone is mounted on the bottom side of a stainless steel plate acting as a sediment vibration sensor. The amplitude and frequency attributes of each single impact are analysed and linked to characteristics of the transported material. Therefore, D2 only concerns moving objects without any embedded sensor and a piezoelectric hydrophone mounted on the bottom side of a stainless steel plate.

A second article (D3) has been written by Dr. Oliver Gronz et al. in 2016 which is entitled "Smartstones: A small 9-axis sensor implanted in stones to track their movements", pages 245 to 251, www.elsevier.com/locate/catena. This second article (D3) relates to a smartstone probe (mounted into a pebble or gravel) consisting of a metal cylinder with a flexible antenna and containing a Bosch BMX055 sensor composed of a triaxial accelerometer, magnetometer, gyroscope, a memory to store data, active RFID (radio-frequency identification) technique to transmit data and two button cells as power supply. It identifies the movement of stones like rock falls in mountains or slower movements in fluvial and glacial environments and erosion protection measures. Therefore, D3 only concerns one sensor embedded into a moving object together with a first radio-frequency identification transmitter also embedded into this same moving object.

A third article (D4) written by S. A Shearer et al. concerns "Elements of precision agriculture: basics of yield monitor installation and operation", cooperative extension service, university of Kentucky, college of agriculture, pages 1 to 9. It relates to a typical installation of a mass flow sensor in the clean grain elevator housing (FIG. 3).

Plate and rock-accelerometer records are signals characterized by strong variations of amplitude and frequency components with time. Such kinds of signals are then usually processed through a time-frequency analysis. In the domain of signal processing, time-frequency methods are numerous and designed for different purposes (e.g., Mallat 1999). Sparse time-frequency representations based on the matching pursuit algorithm (Mallat & Zhang, 1993) have proved to be very well adapted to characterize complex waveforms such as EEG (Electroencephalogram, e.g., Benar et al., 2009) or seismic signals (Bardaine et al., 2006), which share many identical features with impact plate or smartstone measurements (e.g., highly non stationary, sharp transients).

It is known that an accelerometer is a device that measures proper acceleration, which is not the same as coordinate acceleration (rate of change of velocity). For example, an accelerometer at rest on the surface of the Earth will measure acceleration due to Earth's gravity, straight upwards (by definition) of g~9.81 m/s$^2$. By contrast, accelerometers in free fall (falling toward the centre of the Earth at an acceleration of about 9.81 m/s$^2$) will measure zero. Accelerometers have multiple applications in industry and science. Accelerometers are used to detect and monitor vibration in rotating machinery. Accelerometers are used in tablet computers and digital cameras so that images on screens are always displayed upright. Accelerometers are used in drones for flight stabilisation. Single and multi-axis models of accelerometers are available to detect magnitude and direction of the proper acceleration, as a vector quantity, and can be used to sense orientation (because direction of weight changes), coordinate acceleration, vibration, shock, and falling in a resistive medium (a case where the proper acceleration changes, since it starts at zero, then increases).

It is also known that a data logger (also datalogger or data recorder) is an electronic device that records data over time or in relation to location either with a built in instrument or sensor or via external instruments and sensors. They generally are small, battery powered, portable, and equipped with a microprocessor, internal memory for data storage, and sensors. Some data loggers interface with a personal computer, and use software to activate the data logger and view and analyse the collected data, while others have a local interface device (keypad, LCD) and can be used as a stand-alone device. It is common for general purpose types to be programmable; however, many remain as static machines with only a limited number or no changeable parameters. One of the primary benefits of using data loggers is the ability to automatically collect data on a 24-hour basis. Upon activation, data loggers are typically deployed and left unattended to measure and record information for the duration of the monitoring period. This allows for a comprehensive, accurate picture of the environmental conditions being monitored.

Calibration in measurement technology is the comparison of measured values delivered by a device under test with those of a calibration standard of known accuracy. The outcome of the comparison can result in no significant error being noted on the device under test, a significant error being noted but no adjustment made, or an adjustment made to correct the error to an acceptable level. Strictly, the term calibration simply means the act of comparison, and does not include any subsequent adjustment. Measuring devices and instruments are categorized according to the physical units they are designed to measure. These units vary internationally, e.g., NIST 150-2G in the U.S. Together, these standards cover instruments that measure various physical quantities such as electromagnetic radiation (RF probes), time and frequency (intervalometer), ionizing radiation (Geiger counter), light (light meter), mechanical quantities (limit switch, pressure gauge, pressure switch), and, thermodynamic or thermal properties (thermometer, temperature controller). The standard instrument for each test device varies accordingly, e.g., a dead weight tester for pressure gauge calibration and a dry block temperature tester for temperature gauge calibration. The calibration process begins with the design of the measuring instrument that needs to be calibrated. The design has to be able to "hold a calibration" through its calibration interval. In other words, the design has to be capable of measurements that are "within engineering tolerance" when used within the stated environmental conditions over some reasonable period of time. Having a design with these characteristics increases the likelihood of the actual measuring instruments performing as expected. Basically, the purpose of calibration is to maintain the quality of measurement as well as to ensure the proper working of particular instrument.

Problem Solution Approach:

The closest prior art is GB 1349248 (D1). D1 discloses a calibration device for an impact plate using known samples corresponding to a first moving object.

The main difference between the closest prior art and the present invention is the characterizing part of claim 1. The samples of GB 1349248 do not comprise any first sensor providing inertial information about the movement of the first object. Moreover, the calibration device does not comprise a high speed camera.

The effect of the above mentioned difference is that at least one second sensor (2A,2B,2C) is calibrated by at least one second means (7) which analyses the data provided by the first sensor (1) and by the second sensor (2A,2B,2C) which are interacting with a first means (6) connected to the second means (7).

The objective problem to be solved by the difference is to find a way to solve the drawbacks of the prior art, namely to respectively determine the number of impacts of the first object (3A) on the plate (5), determine the frequency and the force of the impacts on the plate (5), determine the form and the type of movement of the first object (3A), and determine the spin of the first object (3).

Another objective problem to be solved by the difference is to improve the localization of the place of impact of the moving objects (3A) on the plate (5), and the forces that affect the structure of the moving object (3A).

Still another objective problem is to improve the calibration of the sensors located on the impact plate.

The solution to the above mentioned problem is inventive because no prior art document discloses the use of data representing inertial parameters of the movement of the first moving object and the point of impact for calibrating an impact plate.

It is not easy to calibrate the device (4) of the present invention since an appropriate calibration depends on at least several factors, namely:
the position where the object hits the plate,
the velocity of the object,
the real impact power,
the type of movement (rolling, sliding, jumping, hitting the plate) the objects do moving over the plates.

This problem is solved by combining the synergistic features of the characterizing part of claim 1, which interact between themselves.

Even if the person skilled in the art would combine article D2 with article D3, he could not arrive to the present invention because with the results of the prior art it is not possible to localize the place of impact onto the plate by in-situ measurements. One needs to know the point of impact onto the plate to better assess the characteristics of the object hitting the plate. In comparison to the prior art the present invention performs in-situ measurements without disturbing the functioning of a process with additional exterior measurement equipment.

Essential functions are measured in parallel (speed, spin, track, force, impact location). The prior art documents only measure single parameters but not all of the parameters mentioned previously. Therefore, the prior art documents do not calibrate impact plate sensors with smart moving objects. The prior art documents do neither use in-situ-measurements for this purpose, nor do they register the previously mentioned parameters altogether for the purpose of calibration.

In D2, for the same range of grain size, it is observed that impact signals can exhibit large variability in term of signal frequency and amplitude depending on impact location and types (i.e., mode of transport) onto the plate. The triangular-shaped array of sensors will help to better gauge the variability of the amplitude-frequency attribute pairs according to the impact location and, therefore, greatly reduce the confidence interval length of the calibration between impact signal properties and bedload grain size.

On another hand, the processing of Smartstone accelerometric signals aims providing crucial information about the instantaneous motion of sediment. By analysing snapshots from the high-speed camera, we investigated the possibility to characterize the mode of transport (i.e., rolling, sliding and saltation) through its corresponding signals recorded by both the rock-accelerometer and the array of plate-accelerometers.

The core of the matching pursuit algorithm is to decompose the signal into a set of functions (so-called dictionary). A very complex dictionary (7D-chirplet) has been chosen to get the best approximation of the signal in a minimum number of iterations, i.e., only one. The main drawback of using such a dictionary is the demanding computation time. Optimization procedures have been already applied in the former code to get a computation time faster than the real-time record.

SUMMARY OF THE INVENTION

The present invention relates to a calibration device (4) comprising:
at least one impact plate (5),
the device (4) also comprises:
at least one first sensor (1) embedded into a first moving object (3A) (smartstone), said first sensor (1) measuring the way, velocity, form of movement and impact strength directly in the first moving object (3A) hitting the impact plate (5),
at least one second moving object (3B),
at least a first radio-frequency identification transmitter with antenna (1A) embedded into the first sensor (1), at least one second sensor (2A,2B,2C) attached directly underneath the plate (5) for determining characteristics of the first moving object (3A), when hitting the impact plate (5), at least one first means (6) for receiving first data provided by the first sensor (1), before and while hitting the impact plate (5), and for receiving second data provided by the second sensor (2A,2B,2C), when hitting the impact plate (5), at least a second radio-frequency identification transmitter with antenna (6A) embedded into the first means (6), the first sensor (1) and the second sensor (2A,2B,2C) are interacting with the first means (6), at least one second means (7) for analysing the data provided by the first sensor (1) and by the second sensor (2A,2B,2C) and for calibrating the second sensor (2A,2B,2C) located on the impact plate (5) and determining the characteristics of at least one second moving object (3B) when hitting the impact plate (5), a high speed camera (20) is configured to assess parameters due to the impacts of the first and second moving objects on the impact plate (5).

Preferably the first moving object (3A) is pre-weighed by a method well known by a man skilled in the art.

Preferably the characteristics of the first sensor (1) are chosen among determining the number of impacts of the first object (3A) on the plate (5), determining the frequency and the force of the impacts on the plate (5), determining the form and the type of movement of the first object (3A), and determining the spin of the first object (3). The way the object takes towards the plate is important because it gives the exact location of the point of impact onto the plate "before" the object hits the plate. So the analysing/calibration software of the 7D Chirplet knows the point of impact in advance and can focus on the analysis of the nearest accelerometer and including the information about the distance between the point of impact and the accelerometer.

Preferably if the number of the second sensor(s) (2A,2B,2C) is of three, they are arranged in a triangular pattern (e.g. equilateral triangle, isosceles triangle, scalene triangle, right triangle, obtuse triangle or acute triangle).

Preferably if the number of the second sensor(s) (2A,2B,2C,2D) is of four, they are arranged in a square, a regular square raster, rectangle, rhombus, parallelogram, trapezoid, kite, or trapezium pattern.

Preferably if the number of the second sensor(s) (2A,2B,2C,2D,2E) is of five, they are arranged in a pentagon pattern, e.g. a convex pentagon or a concave pentagon or an irregular pentagon pattern.

Preferably if the number of the second sensor(s) (2A,2B,2C,2D,2E,2F) is of six, they are arranged in a hexagon pattern, e.g. a convex hexagon or a concave hexagon pattern or an irregular hexagon pattern.

Preferably if the number of the second sensor(s) (2A,2B,2C,2D,2E,2F,2G) is of seven, they are arranged in a heptagon pattern, e.g. a convex heptagon or a concave heptagon pattern or an irregular heptagon pattern.

Preferably if the number of the second sensor(s) (2A,2B,2C,2D,2E,2F,2G,2H) is of eight, they are arranged in an octagon pattern, e.g. a convex octagon or a concave octagon pattern or an irregular octagon pattern.

Preferably if the number of the second sensor(s) (2A,2B,2C,2D,2E,2F,2G,2H,2I) is of nine, they are arranged in a nonagon pattern, e.g. a convex nonagon or a concave nonagon pattern or an irregular nonagon pattern.

Preferably if the number of the second sensor(s) (2A,2B,2C,2D,2E,2F,2G,2H,2I,2J) is of ten, they are arranged in a decagon pattern, e.g. a convex decagon or a concave decagon pattern, a regular square raster or an irregular decagon pattern.

Preferably the second sensor(s) (2A,2B,2C) is/are attached to the bottom of the plate (5) in a detachable manner or in a non-detachable manner.

Preferably the first sensor (1) is a 9-axis sensor.

Preferably the first sensor (1) is a Bosch BMX055 sensor.

Preferably the second sensor (2A,2B,2C) is an accelerometer Bruel & Kjaer type 4394 or a Bruel & Kjaer shock accelerometer type 8339.

Preferably the first and/or second moving object (3A,3B) is a stone or is not a stone.

Preferably the first and/or second moving object (3A,3B) is selected from a first family of vegetables particularly potatoes, tomatoes, etc. or the object is selected from a second family of fruits particularly apples, oranges, etc. or the object is selected from a third family of sport balls particularly, tennis, squash, ping-pong, golf, football, handball, rugby balls etc., or the object is selected from a fourth family of pharmaceuticals having at least 2 cm height and 2 cm width.

Preferably the first and/or second moving object (3A,3B) has/have a cubic, cuboid, spherical, cylindrical, conical, triangular prism, hexagonal prism triangular-based pyramidal, square based pyramidal, hexagonal pyramidal shape.

Preferably the first and/or second object (3A,3B) has/have a length or a diameter of at least 2 cm.

Preferably the impact plate (5) is flat, it has a smooth surface and it has a triangular, square, rectangular, rhombus, parallelogram, trapezoidal, kite, pentagonal, hexagonal, heptagonal, octagonal, nonagonal, decagonal, circular, elliptical, crescental, pipe, half-pipe shape.

Preferably the first means (6) is a data logger.

Preferably the second means (7) is an analysing software using a wave-flat analysis dictionary based on multi-scale chirps (swept frequency wave packets) of various shape and duration.

Preferably the wave-flat analysis dictionary is a 7D-chirp atom.

The device (4) must comprise a high speed camera (20).

Preferably the plate (5) is made of a metallic material in particular, zinc, copper, a stainless steel plate or the plate (5) is made of a ceramic material, or acrylic glass, or glass, or of graphene.

The present invention relates also to a calibration process comprising the following successive steps:

embedding at least one first sensor (1) into a first moving object (3A), said first sensor (1) measuring the way, velocity, form of movement and impact strength directly in the first moving object (3A) hitting the impact plate (5), incorporating at least one second moving object (3B), fixing at least one second sensor (2A,2B,2C) directly underneath an impact plate (5), determining a first data provided by the first moving object (3A), before and while hitting the plate (5), via the first sensor (1), determining a second data provided by the first moving object (3A), when hitting the plate (5), via the second sensor (2A,2B,2C), receiving the first data and the second data by at least one first means (6), analysing the data provided by the first sensor (1) and by the second sensor (2A,2B,2C) via a second means (7), calibrating the second sensor (2A,2B,2C) located on the impact plate (5), determining the characteristics of said at least one second moving object (3B) when hitting the impact plate (5), assessing parameters due to the impacts of the first (3A) and second (3B) moving objects on the impact plate (5) by a high speed camera (20).

The present invention still relates to the use of the device (4) for improving waging, sorting, regulating the speed, sequencing and characterizing the first and second moving object (3A,3B). The present invention still relates to the use of the device (4) for measuring the force, the speed, the spin, the weight of the first and second moving object (3A,3B).

The present invention relates finally to a software program implementing the calibration process according to claim 14 when embedded into the second means (7) as defined in claim 1 for analysing the first data provided by the first sensor (1) and the second data provided by the second sensor (2A,2B,2C) in order to calibrate the second sensor (2A,2B,2C) of the impact plate (5) and in order to determine the characteristics of a second moving object (3B) when hitting the impact plate (5).

After the calibration of 2A,2B,2C by multiple impacts of 3A 3B objects (stored in a look-up database)—all hitting objects which are then not smart can be better assessed according to their impact force onto the surface, according to their number hitting the surface and to the position of the impact onto the plate.

| Height (cm) | maximum deviation from mean (%) | |
| --- | --- | --- |
| 3 | 22.4 | −29.4 |
| 5 | 20.8 | −38.8 |
| 7 | 27.2 | −29.5 |

Figures 14, 15:
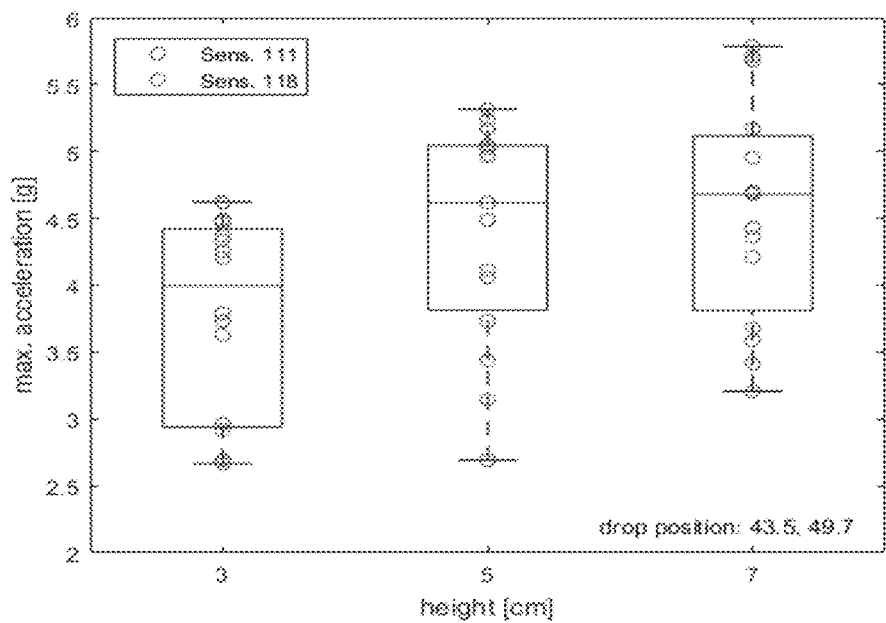
FIG. 14: shows the maximum resultant acceleration (smartstone): wide range and overlap of ranges.

FIG. 15: shows the integral of acceleration peak: smaller range, no obvious relationship to height of fall:

| Height (cm) | maximum deviation from mean (%) | |
|---|---|---|
| 3 | 9.6 | −8.8 |
| 5 | 8.4 | −13.3 |
| 7 | 18.1 | −12.4 |

Figure 16:
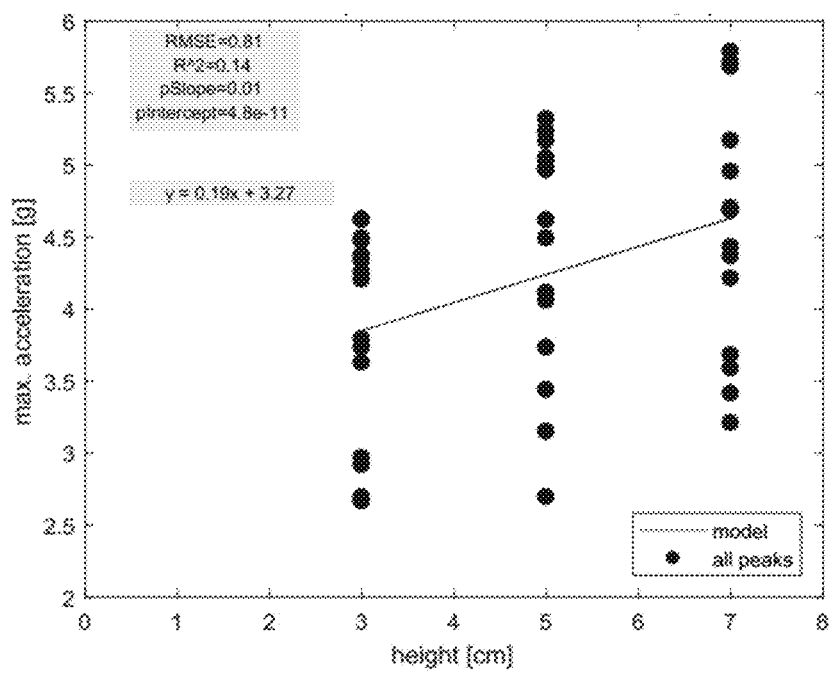

FIG. 16: shows a fit of linear model: all acceleration peaks versus height. R^2 should be read $R^2$, which is the mean amplitude to mean per heights of smartstone peaks.

Figure 17:
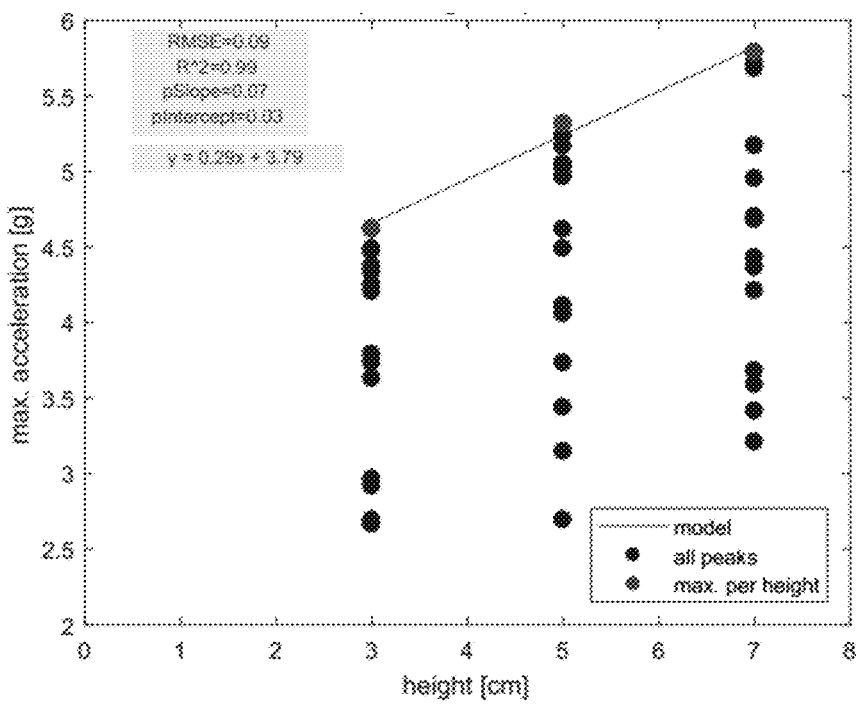

FIG. 17: shows a fit of linear model: maximum peak per height versus height. It shows also a linear relation of maximum peak to drop height as a plausible model. R^2 should be read $R^2$, which is the mean amplitude to mean per heights of smartstone peaks.

Figure 18:
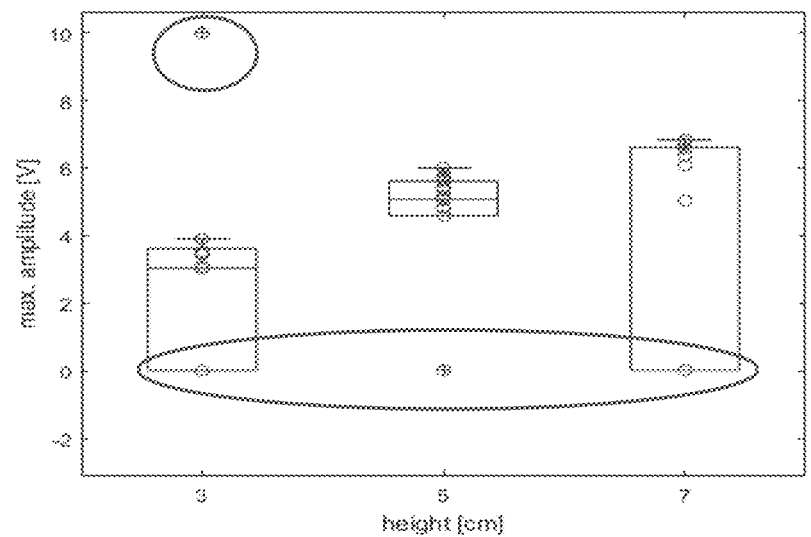

FIG. 18: shows results of plate accelerometers at different drop heights. Small circle: exceeded range? Big ellipse: sensor detached from the steel plate.

Figure 19:
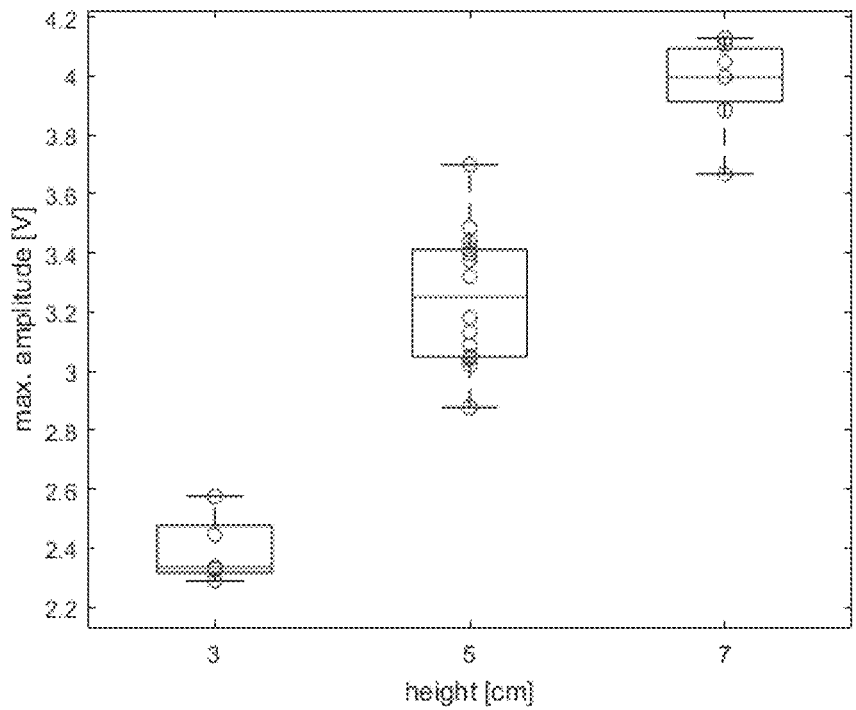

FIG. 19: shows the results of plate accelerometers; smaller range of acceleration peaks (compared to smartstone); removed outliers deviation between 3.7% and 15%

| Height (cm) | maximum deviation from mean (%) | |
|---|---|---|
| 3 | 15.24 | −10.24 |
| 5 | 13.24 | −13.45 |
| 7 | 3.74 | −7.77 |

FIG. 20: is a graph showing the results of plate accelerometers; acceleration signals: example for time-frequency analysis based on wavelet transformation.

FIG. 21: is a graph showing the results of plate accelerometers; acceleration signals: example for time-frequency analysis based on wavelet transformation.

FIG. 22: is a graph showing the results of plate accelerometers; acceleration signals: example for time-frequency analysis based on wavelet transformation.

FIG. 23: is a magnitude scalogram showing the results of plate accelerometers; acceleration signals: example for time-frequency analysis based on wavelet transformation.

FIG. 24: is a magnitude scalogram showing the results of plate accelerometers; acceleration signals: example for time-frequency analysis based on wavelet transformation.

FIG. 25: is a magnitude scalogram showing the results of plate accelerometers; acceleration signals: example for time-frequency analysis based on wavelet transformation.

Discussion of FIGS. 20 to 25:

FIGS. 29 to 34 are prior art used in the system.

FIG. 26: shows smartstone acceleration versus accelerometer amplitude; low determination for linear model to peaks: $R^2=0.03$; mean amplitude to mean per heights of smartstone peaks: $R^2=0.97$.

Figure 27:
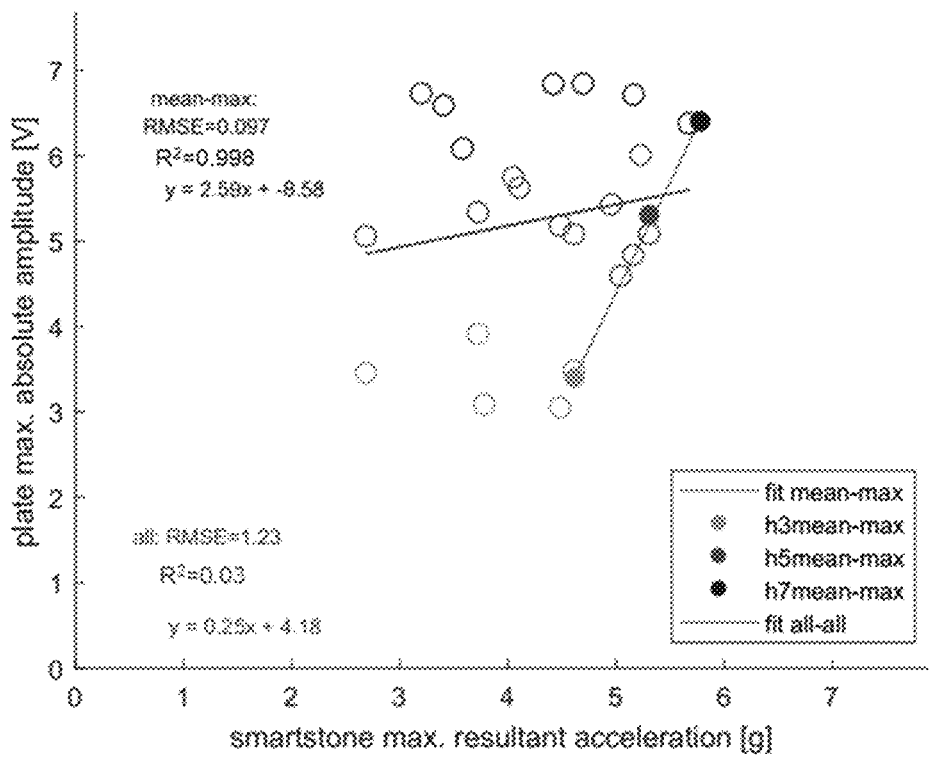

FIG. 27: shows smartstone acceleration versus accelerometer amplitude; low determination for linear model to peaks: $R^2=0.03$; mean amplitude to maximum per height of smartstone peaks: $R^2=0.998$.

Discussion of FIGS. 26 and 27:

The successful calibration is highlighted on FIG. 26 and on FIG. 27. It is the calibration of a 543 g stone. A successful calibration in FIG. 26 and on FIG. 27 is the correlation of smart object and impact sensor signals with a regression line with a height R2 of nearly 1. There is now a solid relationship between the parameters of the smart object and the plate impact measurements. So it is possible to extract from the regression line the information of the smart object only by measuring the plate impact or vice versa.

Figure 36:
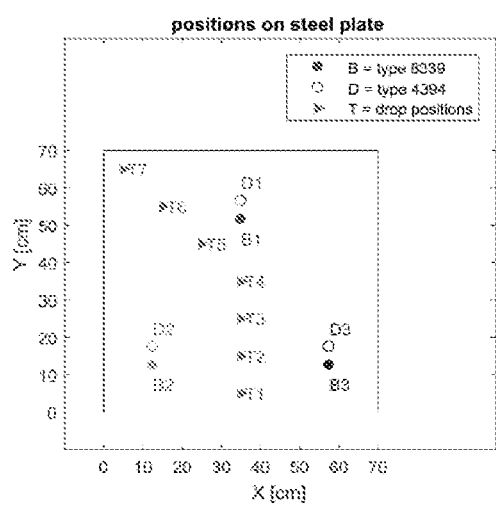
Figure 37:
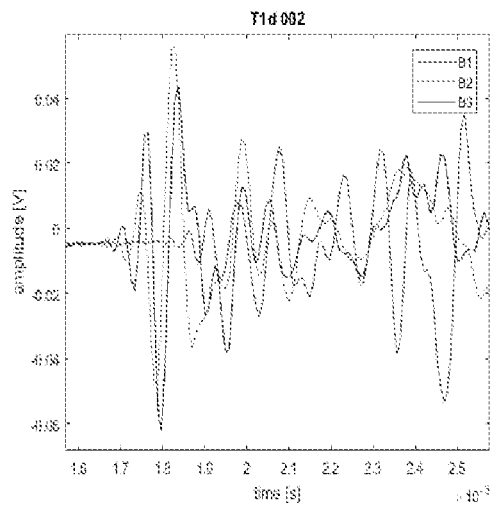

The scalogram with the procedure taken from the prior art technique on FIGS. 20 to 25 gives the mass of the object, and the new calibration on FIG. 26 and FIG. 27 gives the drop height/velocity of the object and the forces acting onto the object. The velocity of the object is also measured via the smart sensor in the object (see FIG. 79). The position of the impact onto the plate is done with the triangulation procedure of FIGS. 36 and 37.

The innovative aspect of the present invention is shown on FIGS. 26 and 27, i.e. the combination of smart object and impact sensor signals.

Figure 28:
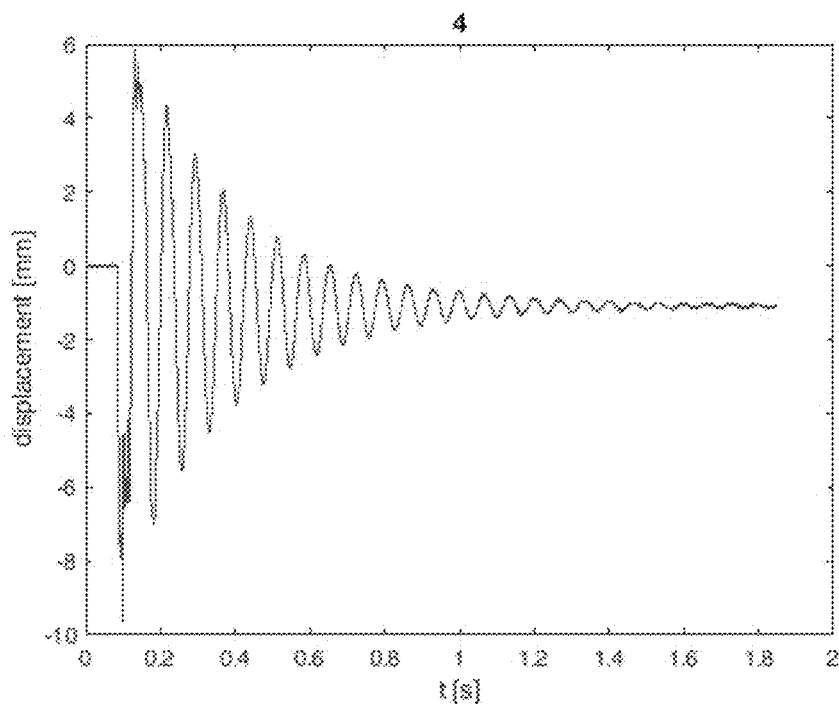

FIG. 28: shows a graph about the high speed camera; displacement and oscillation of steel plate; displacement peaks: range<15%; visible overtones in vibration; change in level due to smartstone weight: compressed rubber, bent steel plate.

Figure 29:
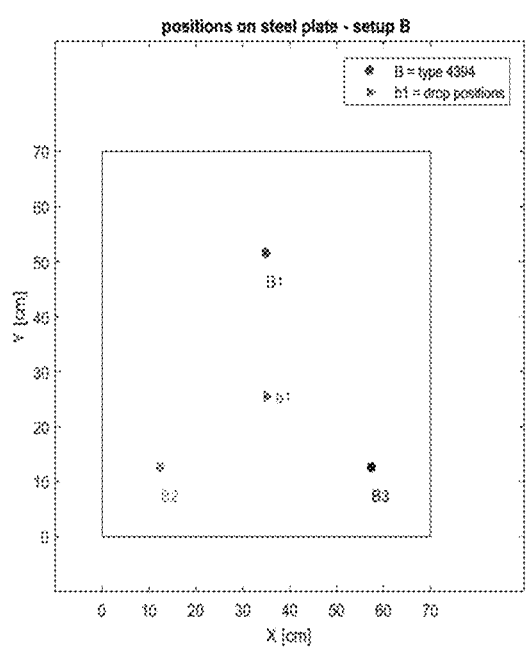

FIG. 29: shows underwater drop tests. Sensor and test setup: smartstone in stone sphere, three accelerometers in the position B1, B2 and B3 (type 4394, sealed with liquid tape), 14 cm water over the steel plate, one drop position (b1) (35,25.5), heights: 3 and 5 and 7 cm.

FIG. 30: shows results of underwater drop tests. Smartstone acceleration data: examples for 7 cm damping of peaks. No free fall (buoyancy and friction in water).

FIG. 31: shows results of underwater drop tests. Smartstone acceleration data: examples for 5 cm damping of peaks. No free fall (buoyancy and friction in water).

FIG. 32: shows results of underwater drop tests; accelerometer data: no useful data recorded at 2 of 3 accelerometers.

Figure 33:
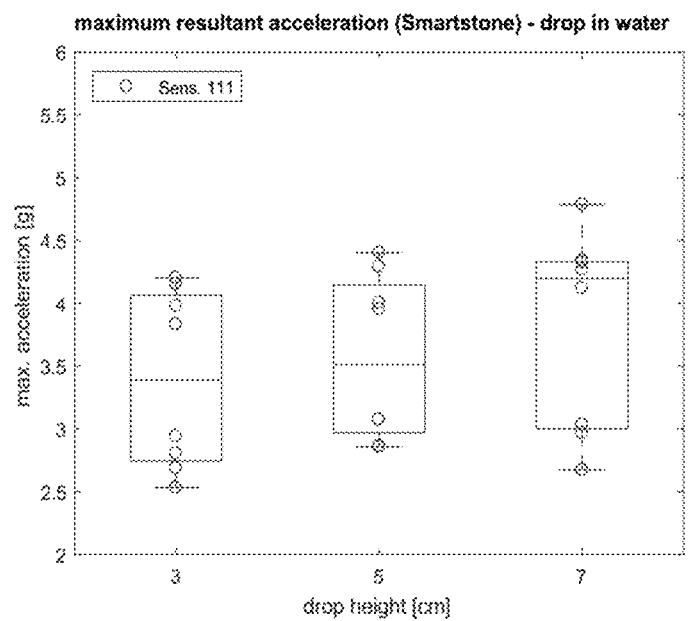

FIG. 33: shows results of underwater drop tests; maximum resultant acceleration: lower mean and maximum (compared to tests without water); similar relative ranges

| Height (cm) | maximum deviation from mean (%) | |
|---|---|---|
| 3 | 23.9 | −25.3 |
| 5 | 23.5 | −19.9 |
| 7 | 25.5 | −29.9 |

Figure 34:
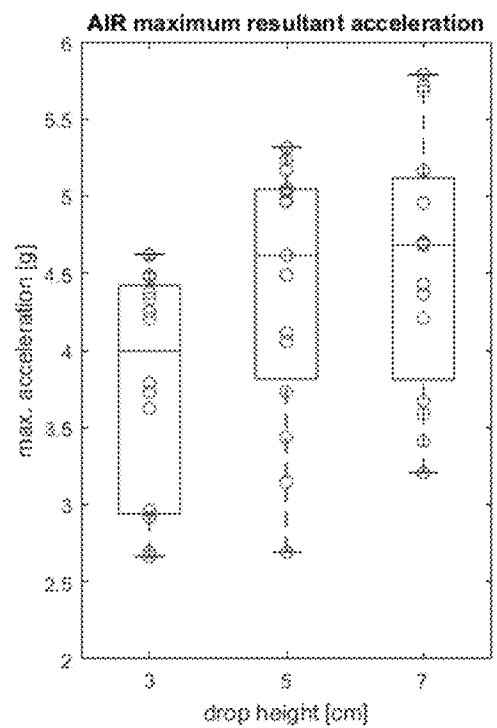

FIG. 34: shows results of air drop tests (air maximum resultant acceleration): comparing water and air (FIG. 45 and FIG. 46); maximum per height: ca. 10-20% lower; overlap of ranges; for maximum per height different slope of regression line; assumption of linear relation still plausible within tested range.

Figure 35:
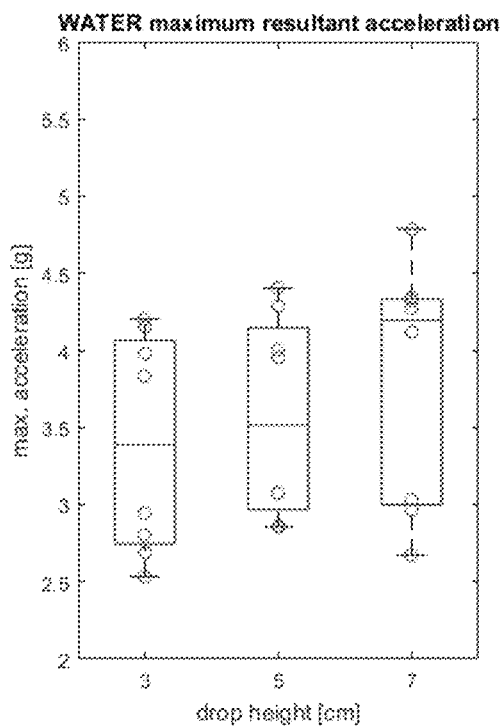

FIG. 35: shows results of water drop tests (water maximum resultant acceleration): comparing water and air (FIG. 45 and FIG. 46); maximum per height: ca. 10-20% lower; overlap of ranges; for maximum per height different slope of regression line; assumption of linear relation still plausible within tested range.

FIGS. 36A and 36B: show transect positions (set up). Smartstone in stone sphere; two types of accelerometers on plate (type 8339—high impact—at B1-B3 and type 4394 at D1-D3); 7 drop positions T1-T7 as transect; constant drop height at 3 cm.

FIGS. 36A and 36B correspond to the prior art used in the system.

Figure 38:
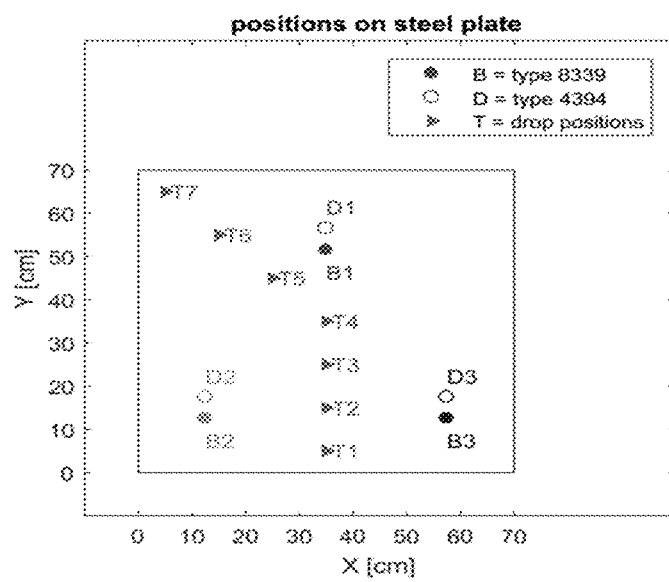

FIG. 38: shows transect positions (set up). Positions T1-T4: 20 repetitions per positions; 10 repetitions per accelerometer type. Positions T5-T7: 10 repetitions per positions; accelerometer type 8339 only.

Figure 39:
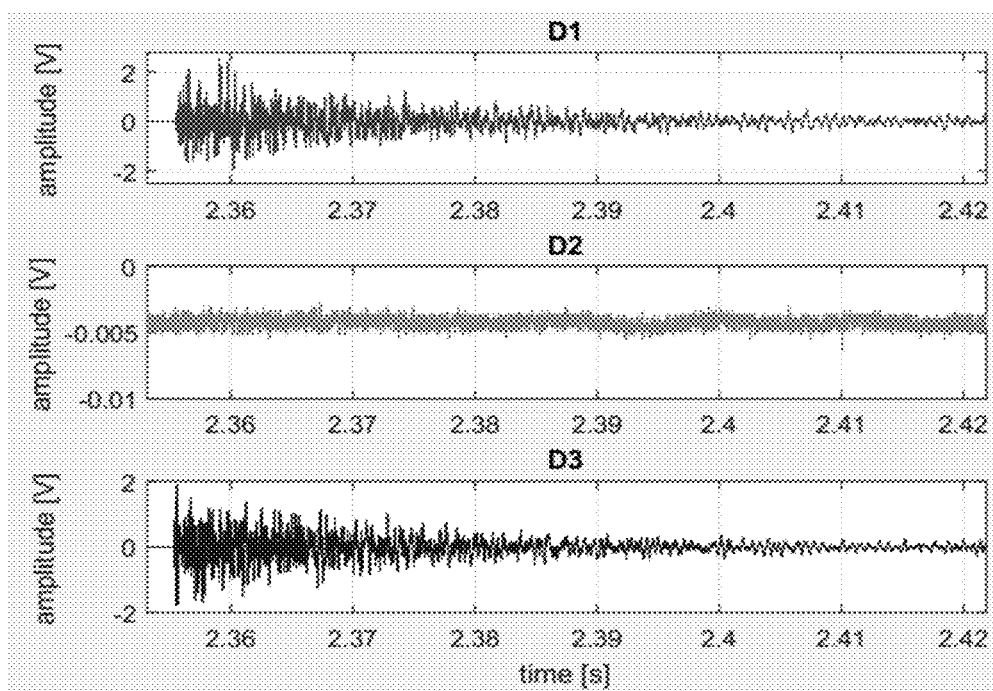

FIG. 39: shows transect positions (examples). Accelerometers type 4394: no usable data for most experiments; example: T1a_001.

Figure 40:
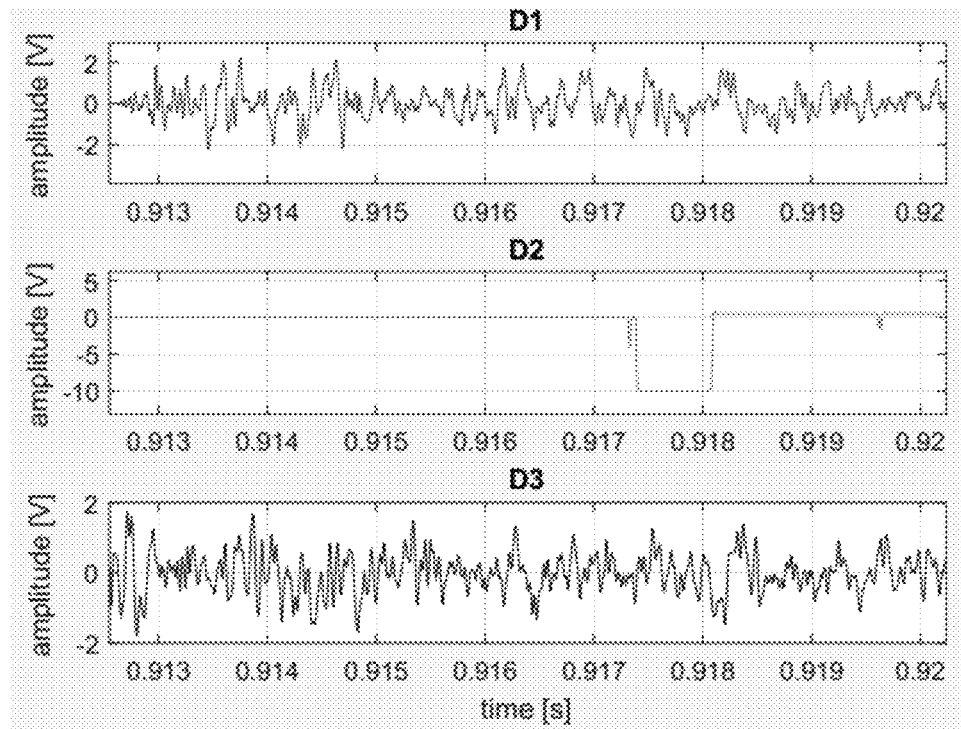

FIG. 40: shows transect positions (examples). Accelerometers type 4394: no usable data for most experiments; example: T1c_001.

Figure 41:
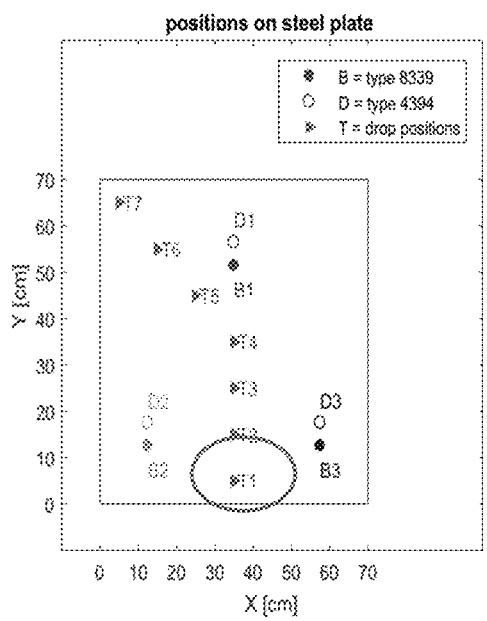

FIG. 41: shows transect positions. Example: T1d 002 (type 8339).

Figure 42:
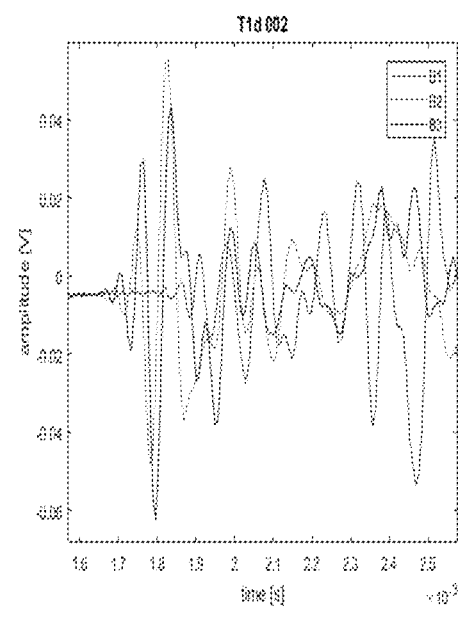

FIG. 42: shows transect positions. Example: T1d 002 (type 8339).

Figure 43:
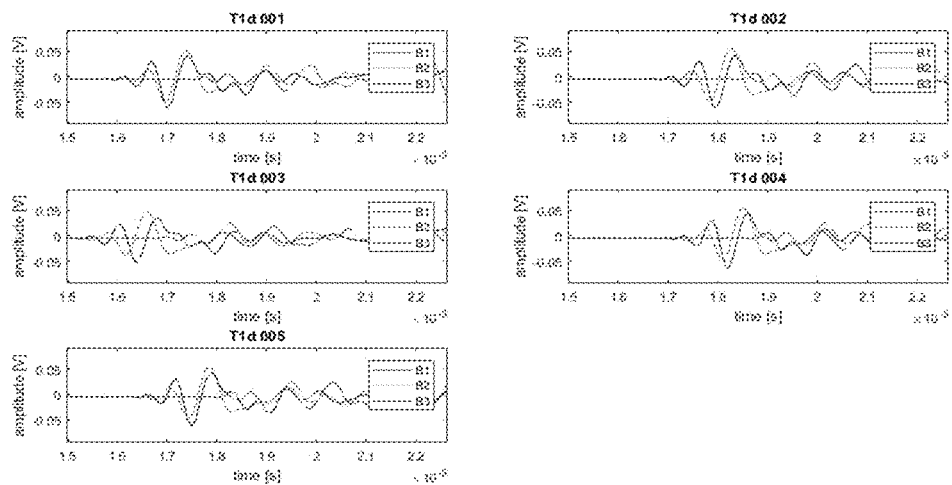

FIG. 43: shows transect positions. Examples T1 repetitions.

Figure 44:
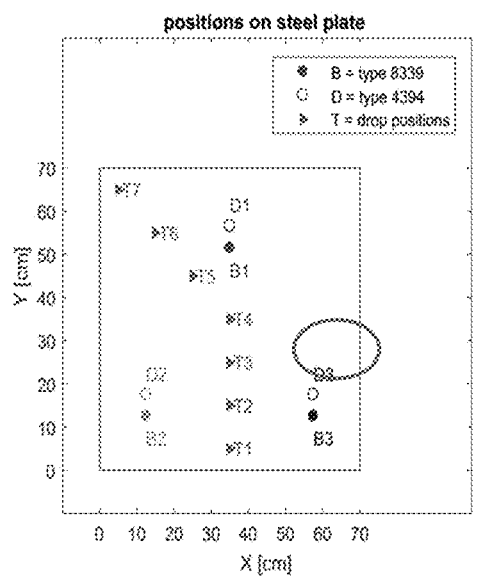

FIG. 44: shows transect positions. Example: T3d 002.

Figure 45:
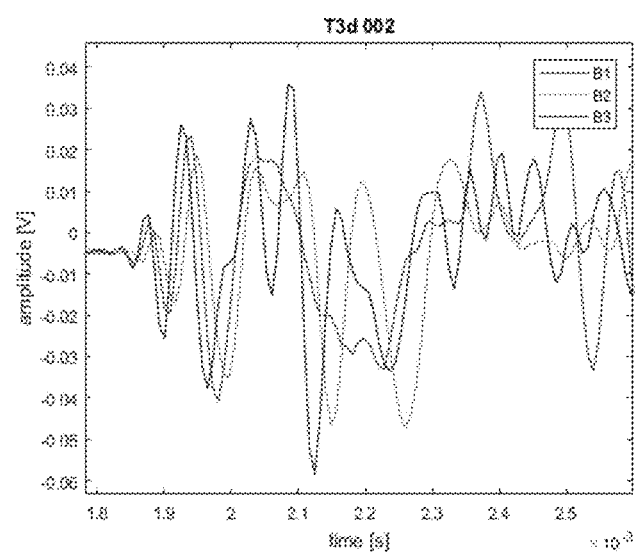

FIG. 45: shows transect positions. Example: T3d 002.

Figure 46:
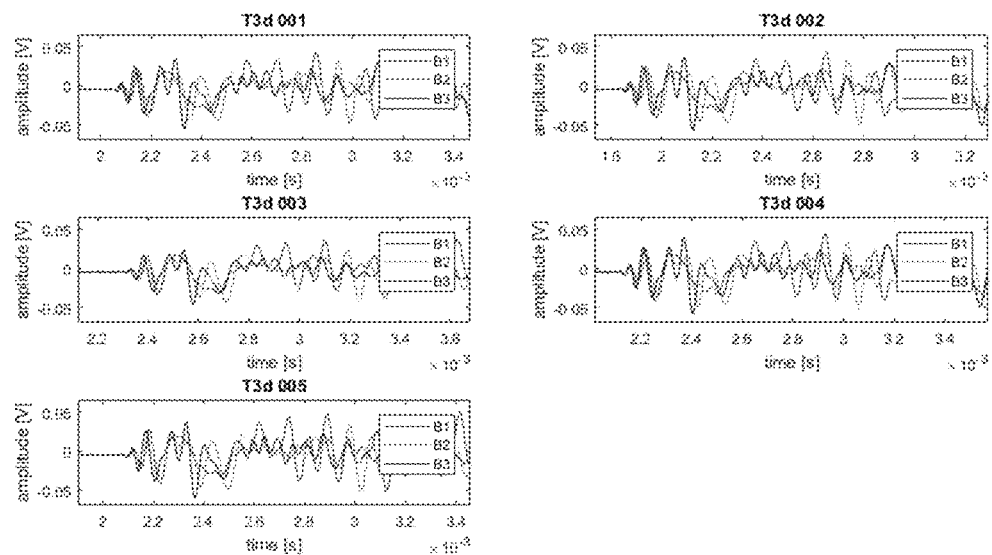

FIG. 46: shows transect positions. Example: T3 repetitions.

Figure 47:
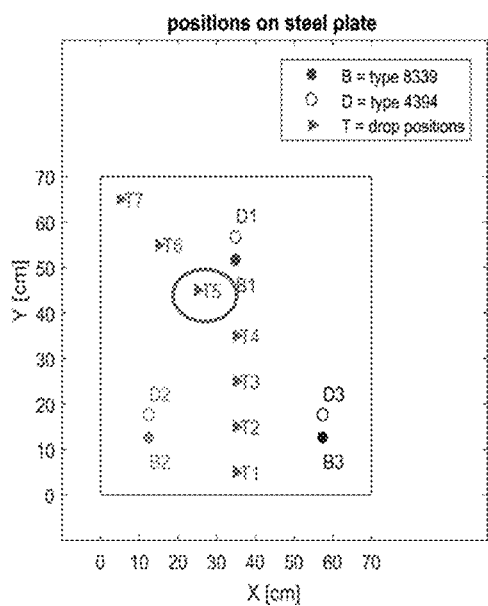

FIG. 47: shows transect positions. Example: T5b 002.

Figure 48:
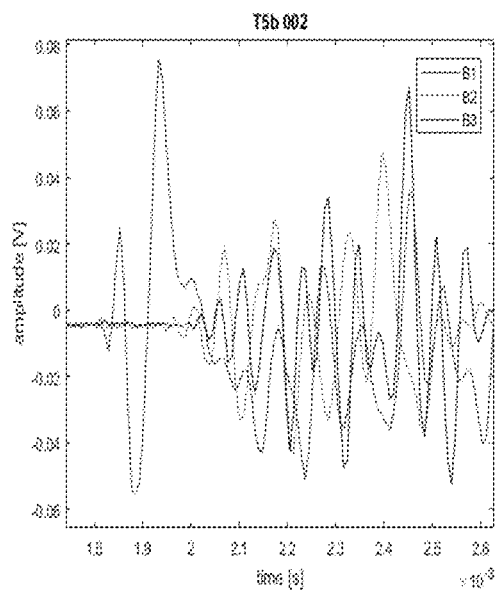

FIG. 48: shows transect positions. Example: T5b 002.

Figure 49:
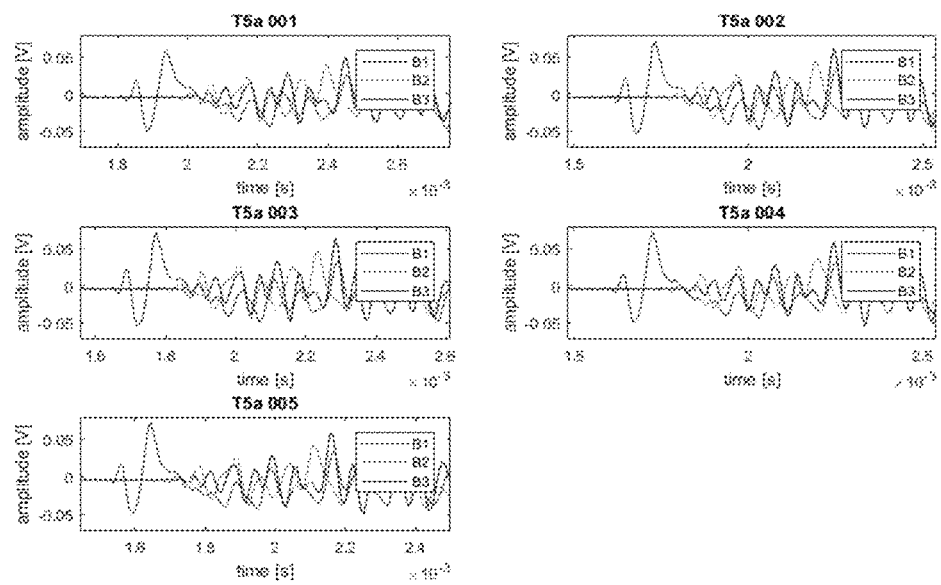

FIG. 49: shows transect positions. Example: T5 repetitions.

Figure 50:
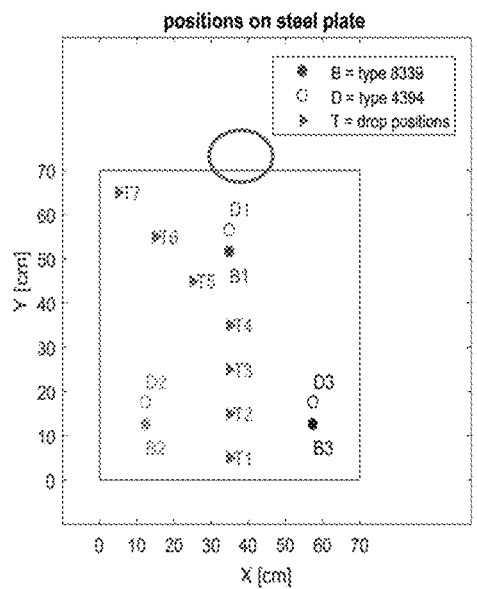

FIG. 50: shows transect positions. Example: T7b 002.

Figure 51:
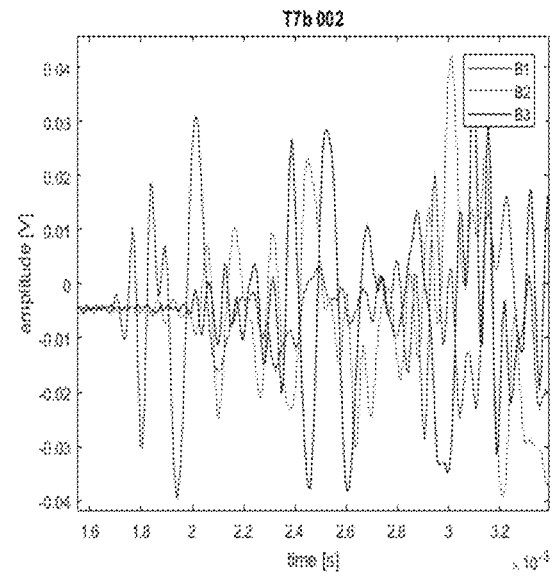

FIG. 51: shows transect positions. Example: T7b 002.

Figure 52:
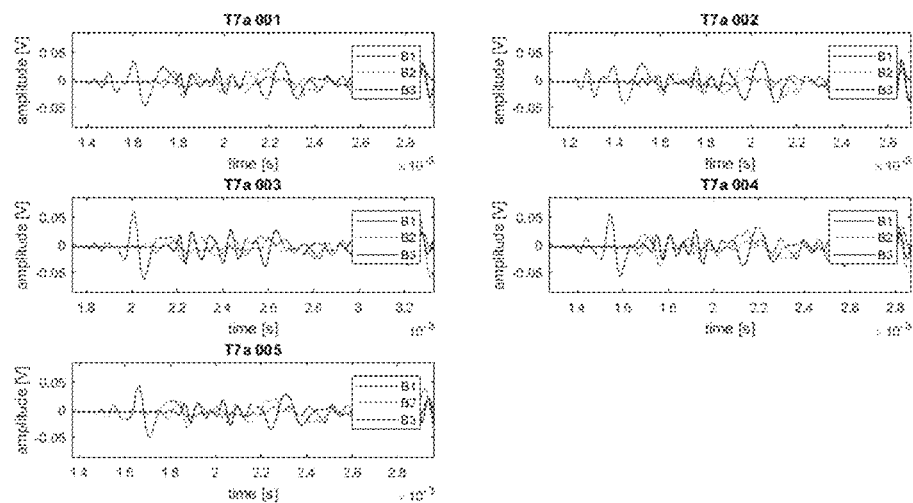

FIG. 52: shows transect positions. Example: T7 repetitions.

Figure 53:
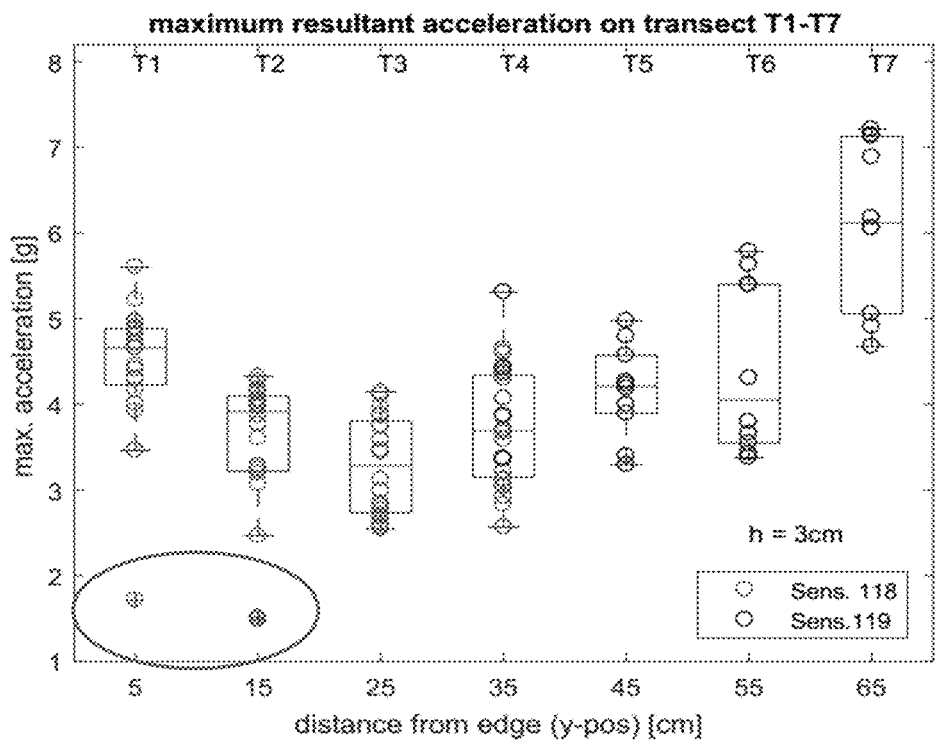

FIG. 53: shows transect positions: results. Smartstone acceleration peak at different positions. Higher acceleration peaks toward edges (T1). Higher acceleration peaks toward corners (T7). Outliers: no clear phase of free fall.

Figure 54:
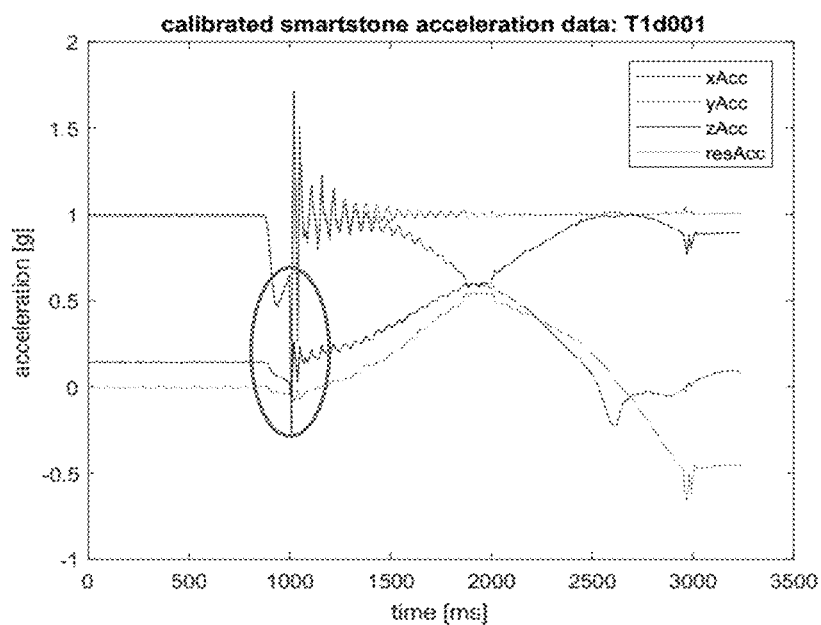

FIG. 54: shows transect positions: results. Smartstone: example for outlier T1d_001. No clear phase of free fall in resultant acceleration. Low peak level.

Figure 55:
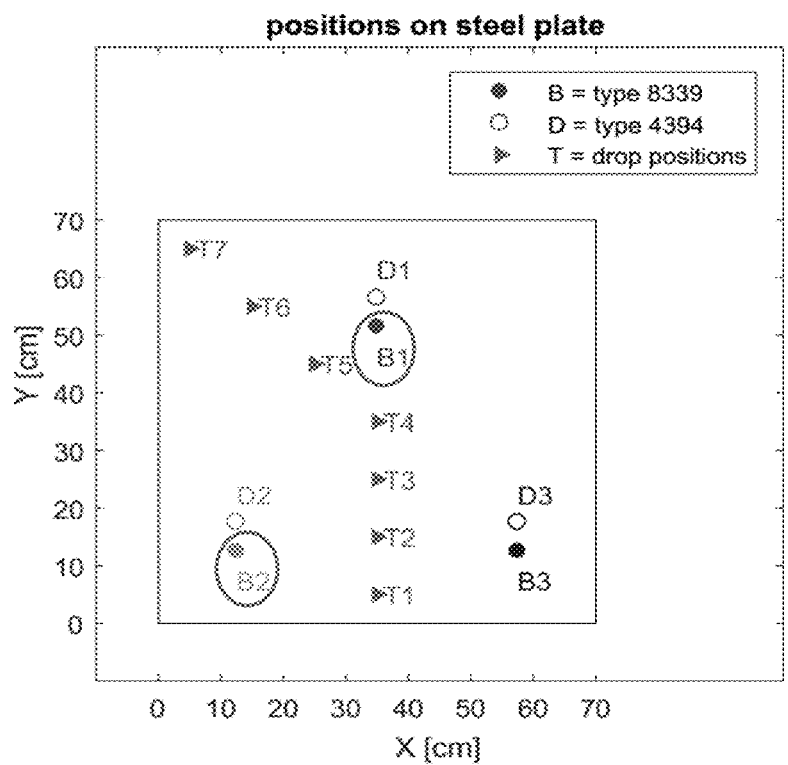

FIG. 55: shows transect positions: results. Accelerometers: time delay of signal arrival B1-B2.

| Pos. | min (ms) | max (ms) | mean (ms) |
| --- | --- | --- | --- |
| T1 | 0.16 | 0.25 | 0.17 |
| T2 | −0.09 | 0.10 | 0.08 |
| T3 | −0.01 | 0.01 | 0.00 |
| T4 | −0.10 | −0.09 | −0.10 |
| T5 | −0.23 | −0.13 | −0.15 |
| T6 | −0.14 | −0.13 | −0.14 |
| T7 | −0.44 | −0.15 | −0.23 |

Figure 56:
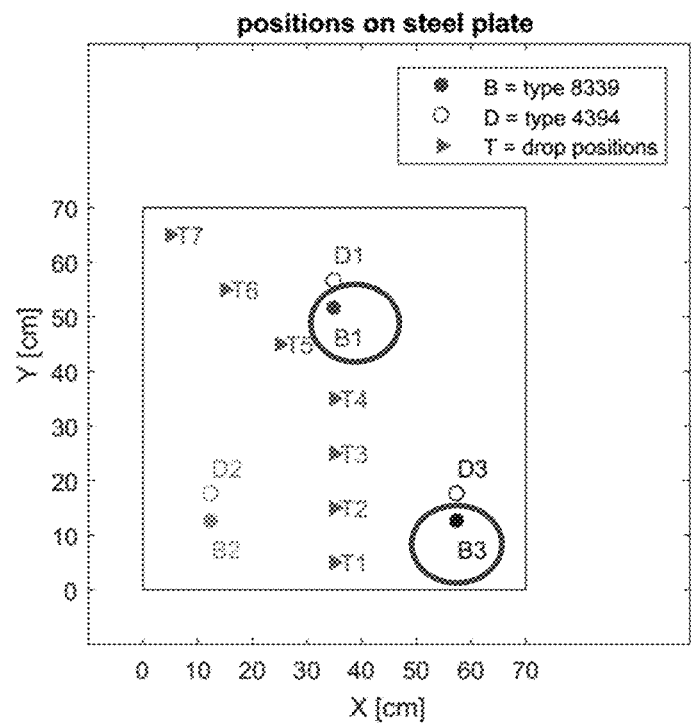

FIG. 56: shows transect positions: results. Accelerometers: time delay of signal arrival B1-B3.

| Pos. | min (ms) | max (ms) | mean (ms) |
| --- | --- | --- | --- |
| T1 | 0.14 | 0.22 | 0.16 |
| T2 | 0.01 | 0.1 | 0.09 |
| T3 | 0 | 0.02 | 0.01 |
| T4 | −0.1 | −0.08 | −0.09 |
| T5 | −0.24 | −0.17 | −0.18 |
| T6 | −0.17 | −0.16 | −0.17 |
| T7 | −0.5 | −0.17 | −0.28 |

Figure 57:
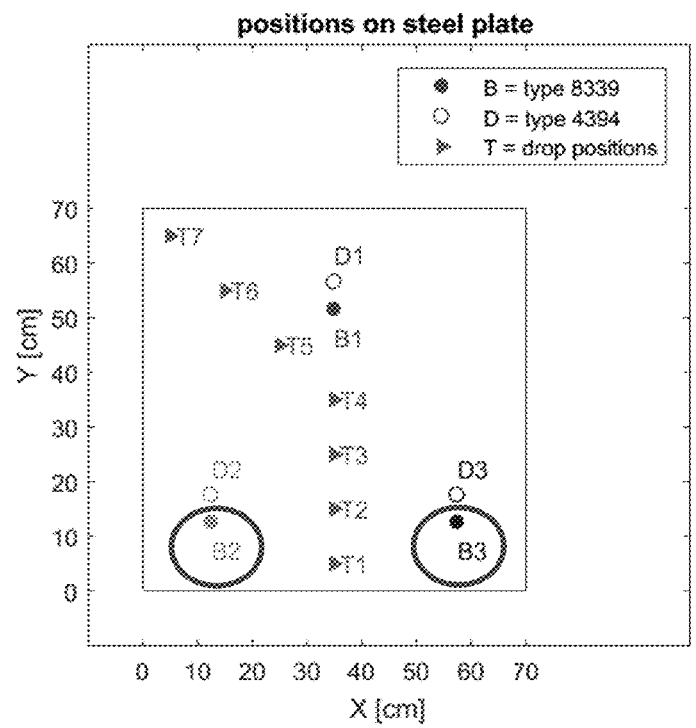

FIG. 57: shows transect positions: results. Accelerometers: time delay of signal arrival B2-B3.

| Pos. | min (ms) | max (ms) | mean (ms) |
| --- | --- | --- | --- |
| T1 | −0.02 | −0.01 | −0.01 |
| T2 | −0.02 | 0.1 | 0.01 |
| T3 | 0 | 0.02 | 0.01 |
| T4 | 0 | 0.02 | 0.01 |
| T5 | −0.04 | −0.01 | −0.03 |
| T6 | −0.17 | −0.16 | −0.17 |
| T7 | −0.09 | −0.02 | −0.04 |

FIG. 58: shows pebbles of three different sizes and masses. Limestone sphere 531 g, granite pebble 279 g, small quartzite pebble 18 g; three accelerometers (type 8339): B1, B2, B3; three drop heights: 3 cm, 5 cm and 7 cm; drop positions: b1(35;25.5).

FIG. 59: shows a graph with the limestone sphere: examples with 3 cm height.

FIG. 60: shows a graph with the granite pebble: examples with 3 cm height.

FIG. 61: shows a graph with the quartzite pebble: examples with 3 cm height.

Figure 62:
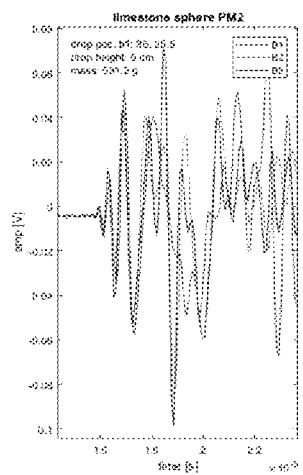

FIG. 62: shows a graph with limestone sphere: examples with 5 cm height.

Figure 63:
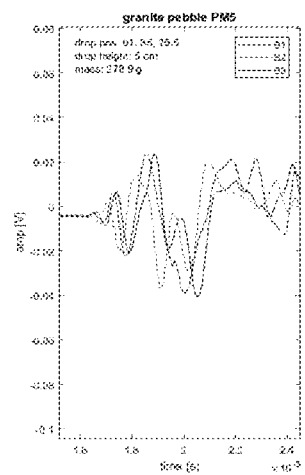

FIG. 63: shows a graph with the granite pebble: examples with 5 cm height.

Figure 64:
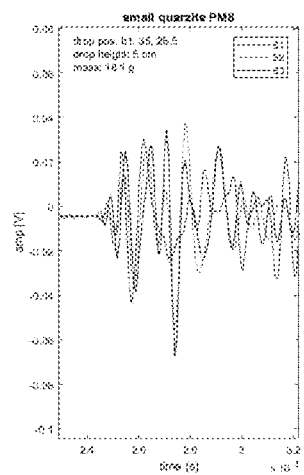

FIG. 64: shows a graph with the quartzite pebble: examples with 5 cm height.

Figure 65:
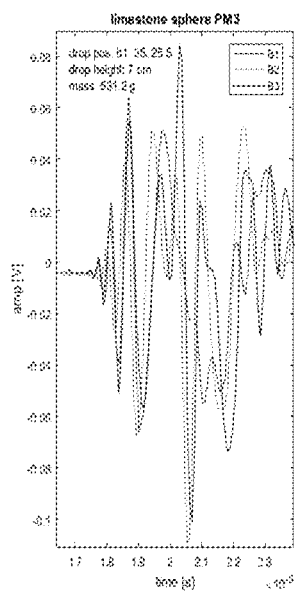

FIG. 65: shows a graph with limestone sphere: examples with 7 cm height.

Figure 66:
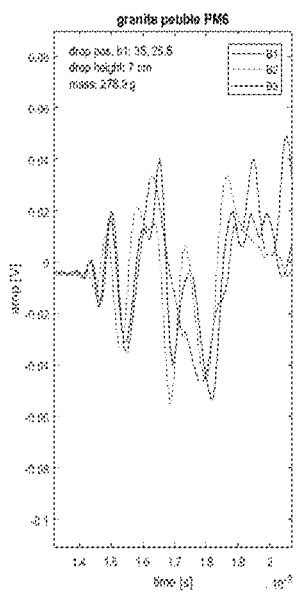

FIG. 66: shows a graph with the granite pebble: examples with 7 cm height.

Figure 67:
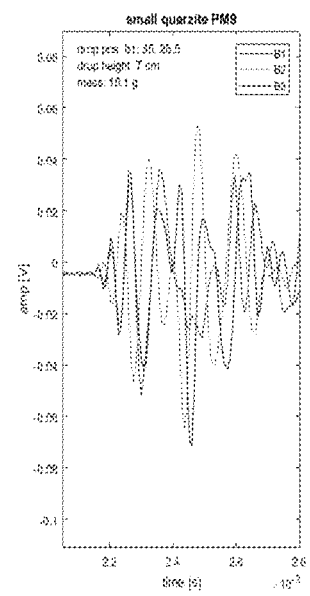

FIG. 67: shows a graph with the quartzite pebble: examples with 7 cm height.

Discussion of results of FIGS. 59 to 67:
Level of acceleration peaks depends on
  Drop height
  Drop position on steel plate
Large range of peak values
  Broad overlap of ranges for drop heights and/or positions
Damping of maximum peak for underwater tests (ca. 10-20% lower)
Maximum peak per height for relative calibration
Type 4394 accelerometers
  High ratio between signal peaks and noise
  no useful data in many cases
  exceeded sensor range and zero shifts
Type 8394 accelerometer (high impact)
  Sensitivity sufficient also for lighter impacts
  Smaller ratio between signal peaks and noise
Smartstone: wide range of peak acceleration (for one height/position)
  Similar range for Sensors 111, 118, 119→not sensor-specific
  Possible explanation?
    "sampling window" of Smartstone distributes measured acceleration peak into different sampling points
    Sampling point at 100 Hz is mean of 10 oversampled points, measured peak appears lower
  Actual acceleration peaks could be too short to be recorded at 100 Hz.

FIG. 68: shows the maximum range exceeded and zero shifts with an accelerometer type 4394. The full signal is visible—zero shift.

FIG. 69: shows the maximum range exceeded and zero shifts with an accelerometer type 4394. First impact: peaks reaching maximum sensor range.

Discussion of the results of FIGS. 68 and 69:
Possible reasons of reaching the maximum sensor range:

Malfunction of data logger or recording software
Electrical malfunctions at cables or connectors
Overloading of piezoelectric elements: might cause zero shifts.
Not caused by wetness: problems occur before tests in water.

FIG. 70: shows a possible mismatch of data logger channels in file (accelerometer type 8339). Order of channel change (2-3), occurs in a small number of datasets: problem at logger or in recording software.

Figure 71:
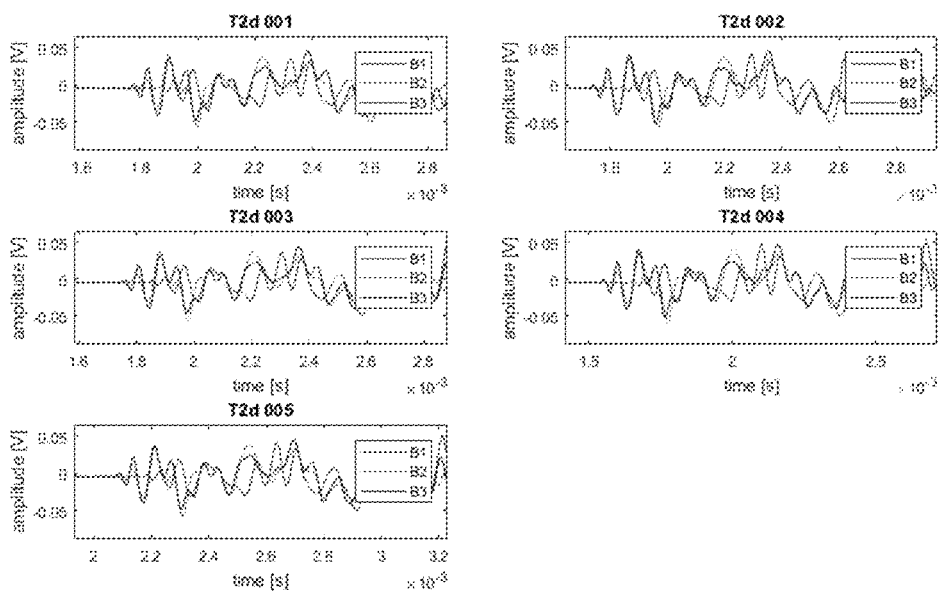

Discussion of the figures:
Variability in data for repetitions
Smartstone acceleration peaks: range<30%
Accelerometer amplitude: range<15%
High speed plate displacement: range<15%
Higher precision for drop height and positions to reduce variability?
Smartstone acceleration
Peaks depend on drop height and position
broad overlap of ranges
considerably lower acceleration in water
Large dataset needed to derive calibration parameters
Accelerometer signals
Type 8339 shock accelerometer: sufficient signal-noise ratio, amplitude peaks well within range
Observable differences in time-of-arrival
Further analysis of amplitude-frequency needed
Experimental setup
Sufficient for simple test cases, large number of repetitions possible
Improvements needed: mounting and sealing of accelerometers, support structure
More comprehensive experiments: wider applicability of calibration FIG. 71: shows transect positions: examples T2 repetitions.

Figure 72:
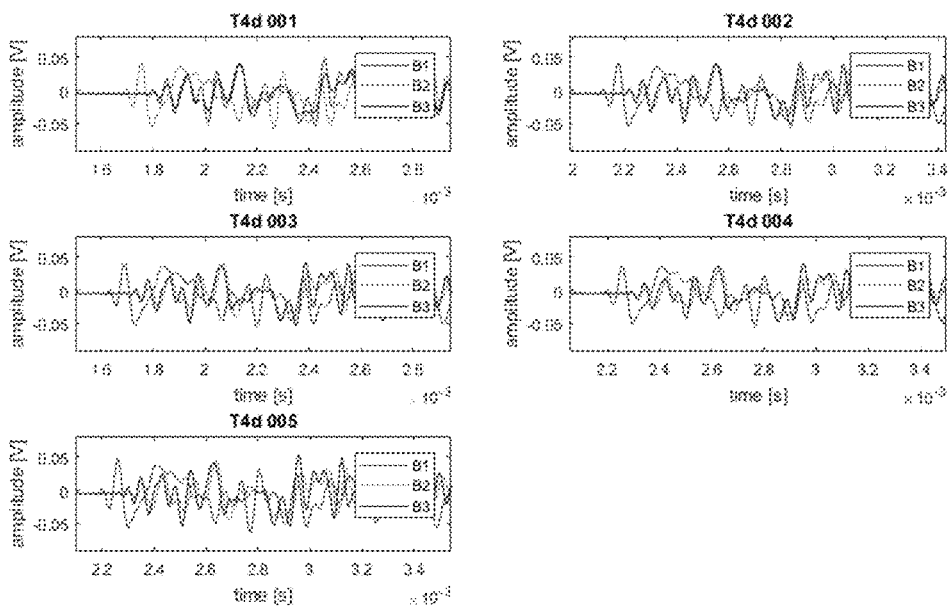

FIG. 72: shows transect positions: examples T4 repetitions.

FIG. 73: shows transect positions: examples T6 repetitions.

FIG. 74: shows the orientation, velocity and distance derived by AHRS-algorithm. Raw sensor data and detection of stationary times.

FIG. 75: shows the orientation, velocity and distance derived by AHRS-algorithm.

Figure 76:
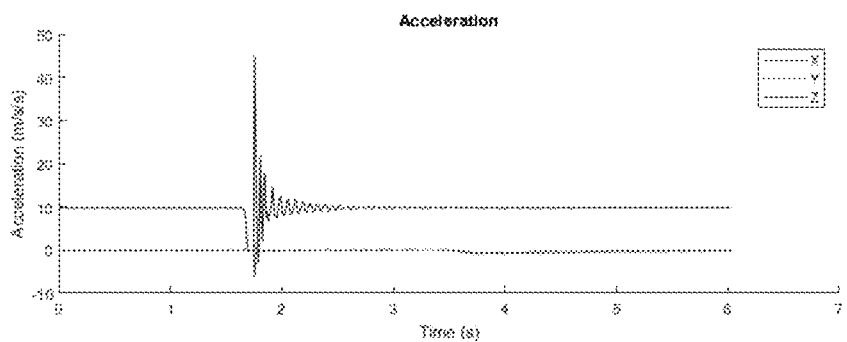

FIG. 76: shows the orientation, velocity and distance derived by AHRS-algorithm. Acceleration, corrected by estimating.

Figure 77:
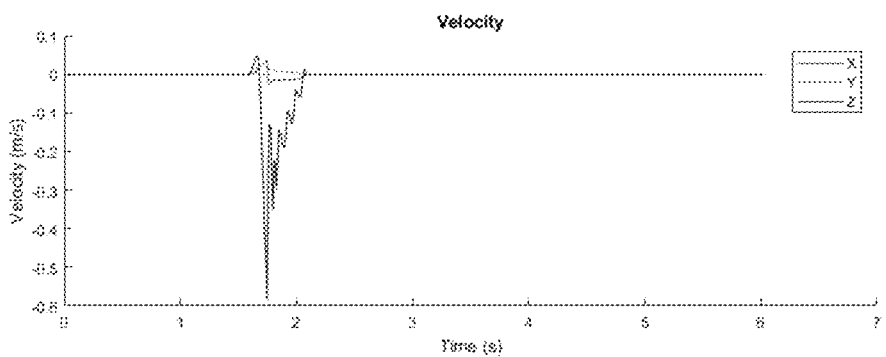

FIG. 77: shows the orientation, velocity and distance derived by AHRS-algorithm. Velocity derived from corrected acceleration.

Figure 78:
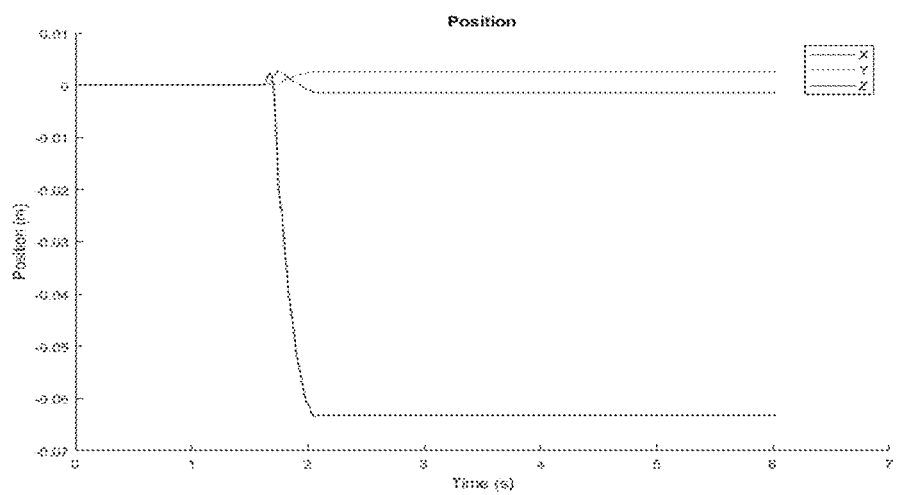

FIG. 78: shows the orientation, velocity and distance derived by AHRS-algorithm. Position derived from corrected velocity.

Figure 79:
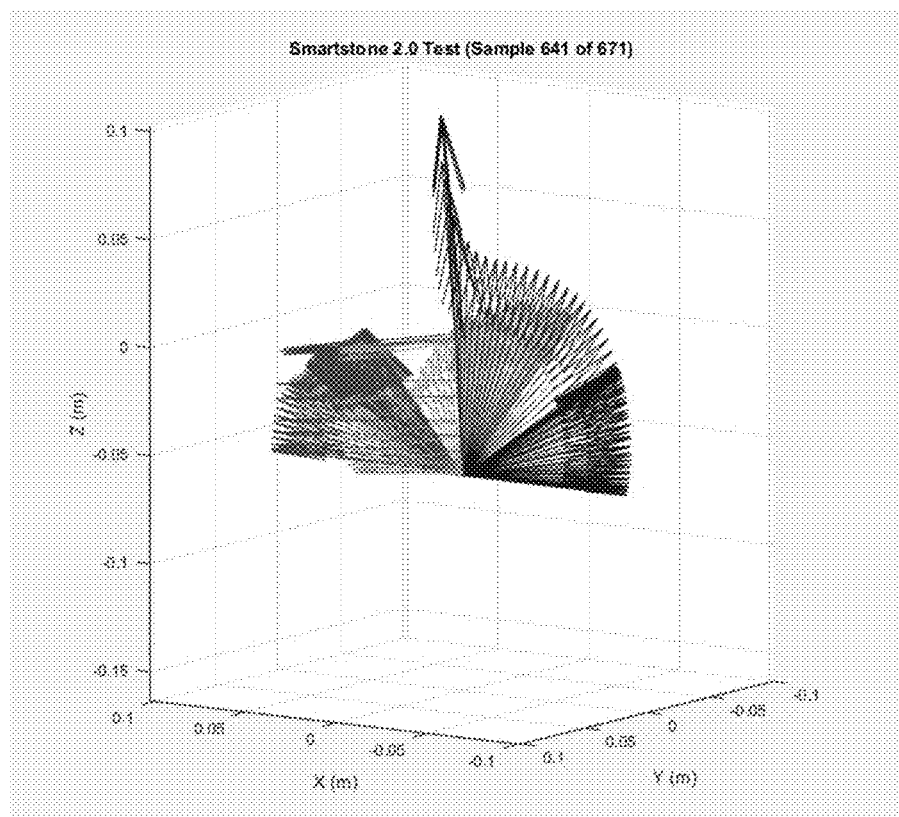

FIG. 79: shows the orientation, velocity and distance derived by AHRS-algorithm.

FIG. 79 corresponds to the prior art used in the system.

DETAILED DESCRIPTION

The smart object (3A) or smart stone (i.e. an object wherein at least one first sensor (1) is embedded into a moving object (3A)) is used to calibrate the impact plate (5) sensor(s) (2A,2B,2C). It is not only calibrated according to the ideal speed of a material transport line (e.g. vegetables, fruits, balls, or pharmaceuticals). It is also possible to calibrate the impact plate (5) sensors (2A,2B,2C) in the sense that the mass of the moving object (3A) is better assessed by the calibrated impact plate (5) sensors (2A,2B, 2C). In addition, the calibration of the impact plate (5) sensors (2A,2B,2C) will improve the quality of the assessment of the form of the moving object (3A) and its spin (rotation). Furthermore, the calibrated impact plate (5) sensors (2A,2B,2C) enable to better locate the place of impact of the moving object (3A) on the plate (5), and the forces that affect the structure of the second moving object (3B). According to this last point it is possible to assess the force onto the second moving object (3B) by a smart moving object (3A) (this object records the forces from the accelerometer). When you know the corresponding signal at the impact plate (5) sensors (2A,2B,2C) then it is later possible only to use the impact plate (5) sensors (2A,2B,2C) as the assessment tool without smart objects. In the present invention calibration is preferably realized with moving objects (3A) that are pre-weighed. So you hit the moving object (3A) of a known weight and speed onto the impact plate (5) sensors (2A,2B,2C) to be calibrated. These calibrations are in-situ, because the smart moving objects are real objects of the process in the production line to be investigated. It is therefore possible to make in-situ measurements with a first sensor (1) implanted into the moving object (3A).

The word "calibration" means in the present invention that a database is collected on the second means (7) where signals registered by second sensors (2A,2B,2C) are arranged for each "smart impact". These smart object hitting signals (amplitude and central frequency of first impact 7D chirplet) from second sensors (2A,2B,2C) are stored in the second means (7) in addition to the corresponding information for each signal on speed of the object, location of impact of the object, mass of the object, and spin of the object. This spectra database with the additional information is the calibration database. First moving object (3A) and second moving object (3B) are only used to assess this additional information linked to the second sensors (2A,2B,2C) spectra. Once the database is accessible it is possible to assess each impact of any object by a simple look-up correlation with the database of calibrated impacts.

Using "smart objects", where the sensors are implanted into the moving objects (3A), which are hitting or scratching the plate opens new possibilities for relevant calibrations. The first moving object (3A) containing the BMX055 sensor module includes an active radio-frequency identification chip, an accelerometer, a magnetometer and a gyroscope. This kind of well-known sensor is developed by the company SST (smart sensor technologies) in Rheinberg (Germany). In this case, the self-calibrating probe is powered by button cells (1.55 V, 20 mAh). This module comprises a triaxial 12 bit acceleration sensor, a triaxial 16 bit gyroscope, and a geomagnetic sensor, together with an active RFID tag, memory, a chronometer, and a thermometer. The sensor module data provides orientation, tilt, motion, acceleration, rotation, shock, vibration and heading of the probe. The chronometer and thermometer provide auxiliary data on time (resolution $1/32768$ s) and temperature. The ranges of the sensor module are +/−4 g for the accelerometer (where g denotes the acceleration due to gravity), +/−2500 µT for the magnetometer (where T denotes the unit Tesla), and +/−2000° s$^{-1}$ for the gyroscope. One sensor axis is aligned with the long axis of the cylinder, the other two axes orientations are indicated by the battery screw.

The two sensors are of different types (the first sensor (1) is the sensor implanted inside the smart 50 moving object (3A), the second sensor (2A,2B,2C) is of the type of sensor placed under the impact plate (5)). All second sensors (2A,2B,2C) are connected with each other by an electric cable. We use at least two different types of sensors in the present invention.

The first sensor (1) implanted inside the smart moving object (3A) is a BOSCH BMX055 sensor module including an active radio-frequency identification chip (active RFID tag), a triaxial 12 bit acceleration sensor (accelerometer), a geomagnetic sensor (magnetometer), and a triaxial 16 bit gyroscope. This first sensor (1) is connected to the data logger via a small antenna placed inside the smart moving object (3A) and an antenna at the he outside of the data logger (6A). The first sensor (1) is built into the moving object (3A), and that's why the moving object (3A) is called a "smart object".

The second type of sensor (2A,2B,2C) may be glued, fixed, screwed under a stainless steel plate and acts as an impact sensor. The plate can also have various other shapes (e.g. pipe, half-pipe). At least one second sensor (2A,2B,2C) may be glued, fixed or screwed underneath the impact plate. These second sensors are also commercially available. It is preferable to use at least a triangular shaped array of three second sensors (2A,2B,2C) instead of one sensor. A triangular pattern of the second sensors (2A,2B,2C) allows detecting the location of the first impact of the smart object in addition to the localization of this impact with help of the smart object (3A) and of the high speed camera (20) (please refer to FIG. 2).

The first and second sensors do not exchange data between each other.

Measuring the way, velocity, form of movement and impact strength directly in smart moving objects (3A) hitting the impact plate (5) enables us to improve the calibration method.

Plate acoustic impact sensor(s) and smart moving object records are signals characterized by strong variations of amplitude and frequency components with time. The signals from both systems are processed through a time-frequency analysis and time-series analysis (matching the temporal axis of both systems). Smart object signals can be processed with similar techniques than the one used for the plate-accelerometer (i.e., time-frequency transform). Main interests of the smart object are the speed of the object, the spin, the impact forces and the spatial information where the object hits the plate. A successful identification of the type of motion from smart object signal characteristics is possible, it should be a major contribution to the plate impact sensor calibration results. By combining plate and rock-accelerometer, this complete set-up is considered as a new spatio-temporal measuring device.

Advantages of the Invention

An advantage of the present invention over the prior art is that it is possible to calibrate a device (e.g. to regulate the speed of a production line in view of the impact force of an object (e.g. a potato) against an impact plate, e.g. if potatoes are too much shocked). In the prior art it is not possible to calibrate anything due to the lack of several technical apparatus.

Another advantage is that the smart moving object (3A) used for the calibration registers its way over the impact plate (5) (e.g. hitting, creeping, rolling). In addition, the second sensors (2A,2B,2C) measure in-situ hits to the plate (5) without disturbing the calibration process with external measurement equipment.

Figure 1:
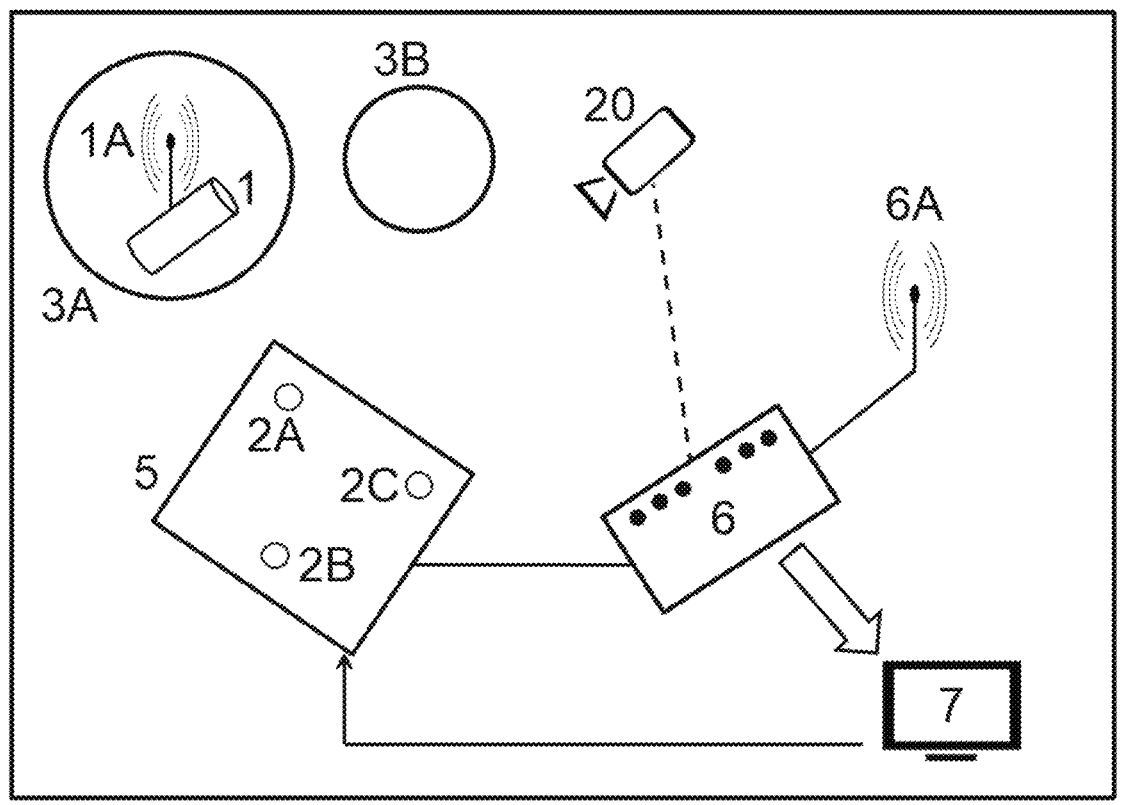
FIG. 1: shows a schematic presentation of the device (4) of the present invention. The drawing is not at scale (e.g. the impact plate (5) is bigger than the first moving object (3A) normally). The high speed camera (20) is necessary. Data from the first (1) and second sensors (2A,2B,2C) are directly collected on the data logger (6) in real time. The data logger (6) gives a common time stamp to all datasets. Directly connected to the data logger (6) is a software embedded in the second means (7) which analyses the data set with a chirplet analysis of the first impact of the object. This chirplet analysis is used to characterize the size and the characteristics of the object (3A,3B) hitting the plate (5). In addition, the specific impact point onto the impact plate (5) is directly assessed by the data from the smart object (3A) and via cross correlation from the triangular shaped orientation of the second sensors (2A,2B,2C).
Figure 2A:
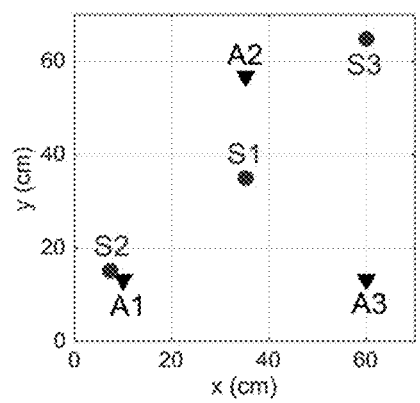
FIG. 2A shows a triangular shaped localization of the three impact sensors (2A,2B,2C) under the impact plate (5). S1, S2 and S3 mean object (stone) drops or impacts on the superior surface of the plate (5). A1, A2 and A3 mean accelerometers or second sensors (2A,2B,2C).
Figure 2B:
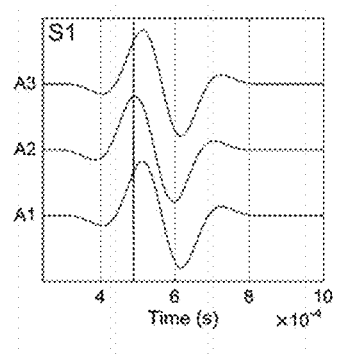
FIG. 2B: the object (stone) drop S1 is equidistant from accelerometers A1, A2 and A3 on the impact plate (5).
Figure 2C:
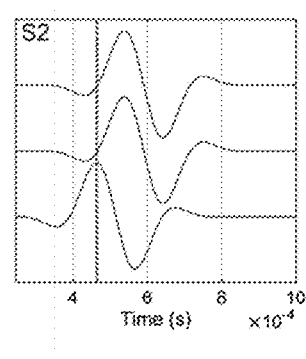
FIG. 2C: the object (stone) drop S2 is located, on the impact plate (5), very near to (or even directly above) accelerometer A1 and at about the same distance from A2 and A3.
Figure 2D:
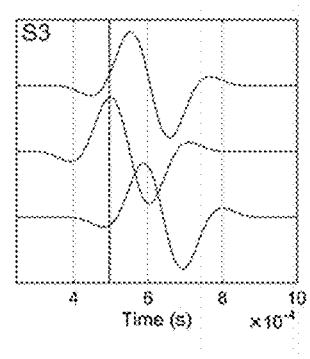
FIG. 2D: the object (stone) drop S3, on the impact plate (5), is located near accelerometer A2 but further from A3 and even further from A1.
Figure 3A:
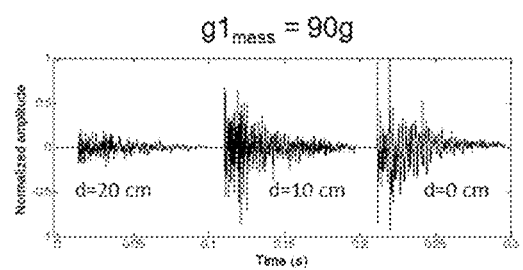
FIGS. 3A and 3B: show the importance of the impact location for the assessment of the characteristics of the objects hitting the plate. It also shows that it is not possible to differentiate between stones of 6 g (g2) or 90 g (g1) hitting a plate when you do not know the point of impact. To the contrary with a smart object that tracks its way to the plate this localization is possible (not shown on this figure). In this experience, two objects (gravels) are dropped on an impact plate at three different plate positions (d=20 cm, d=10 cm and d=0 cm), d is the horizontal distance from the centre of the plate where the sensor is located. The title is "hydroacoustic approaches, amplitude/frequency versus position and mass". It shows that the amplitude of the signal increases if the location of the impact of the object is close to the location of a sensor placed under the impact plate.
Figure 3B:
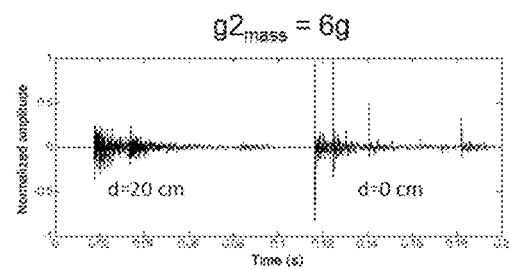
Figure 3C:
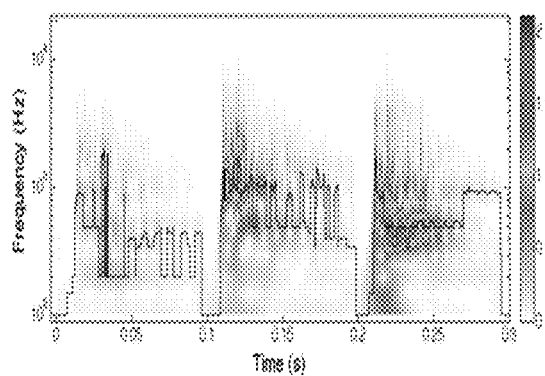
FIG. 3C: this figure shows time-frequency maps obtained by corresponding wavelet transform (using a standard Morlet wavelet) after dropping a 90 grams gravel at 20 cm, 10 cm, and 0 cm from the sensor location. The wavelet coefficients are indicated. The signal has been converted from the temporal domain (amplitude against time) to the frequency domain (amplitude against frequency). The result of this conversion is a spectrum with specific amplitude for each frequency. As this conversion is effected continuously with regard to the time, our database has a three-dimensional structure, i.e. amplitude against frequency against time.
Figure 3D:
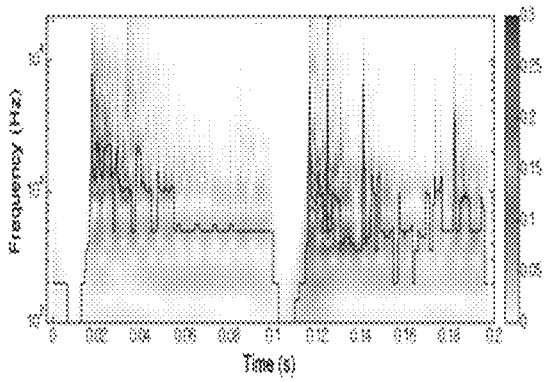
FIG. 3D: this figure shows time-frequency maps obtained by corresponding wavelet transform (using a standard Morlet wavelet) after dropping a 6 grams gravel at 20 cm and 0 cm from the sensor location. The wavelet coefficients are indicated.
Figure 4:
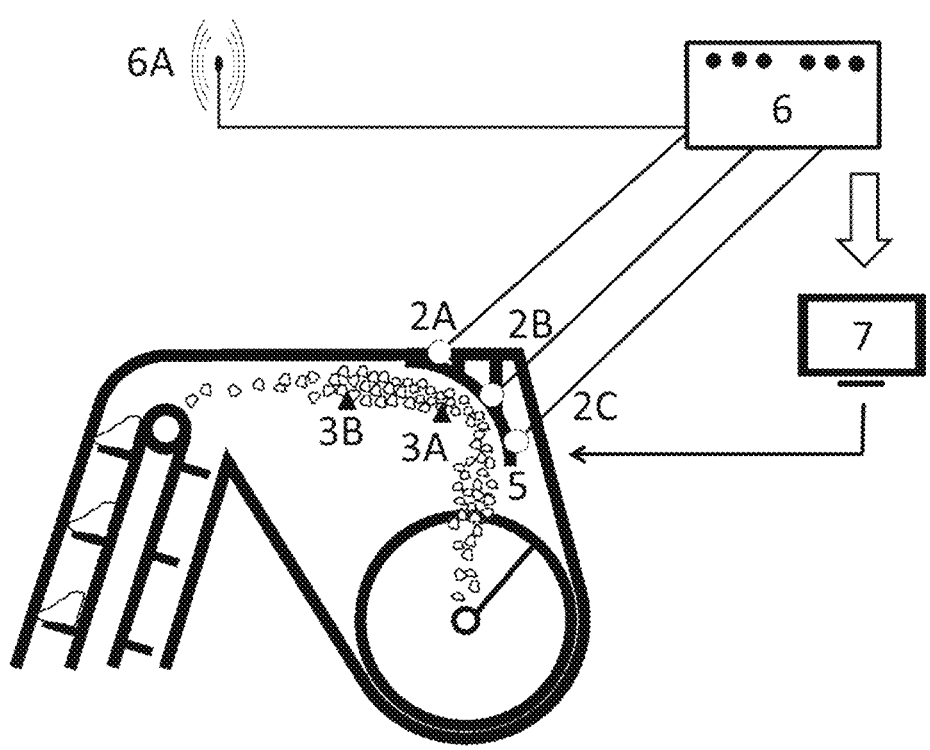
FIG. 4: shows an agricultural application of the present invention. A smart objects elevator projects smart moving objects (3A) and non-smart moving objects (3B) (e.g. a potato, an apple, a ball, or a pharmaceutical) against an impact plate (5) (having second sensors (2A,2B,2C) underneath the plate (5)) for calibration purposes of the impact plate (5) via a first means (6) and a second means (7) which is connected directly to the plate (5). (Part of the figure is taken from S. A. Shearer, J. P. Fulton, S. G. McNeill, and S. F. Higgins, Biosystems and Agricultural Engineering T. G. Mueller, Agronomy: Elements of Precision Agriculture: Basics of Yield Monitor Installation and Operation)
Figure 5:
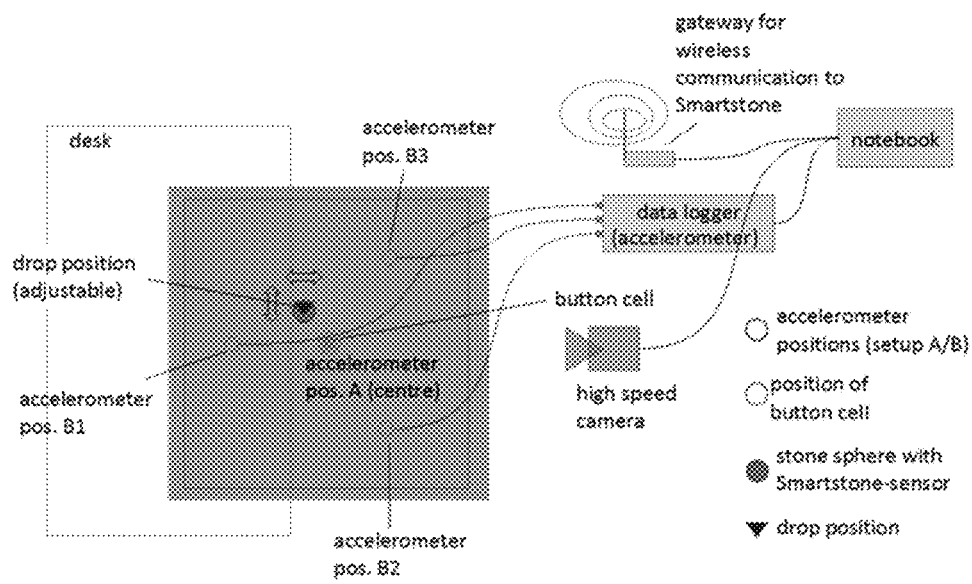
FIG. 5: shows a scheme top view of the device of the present invention.
Figure 6:
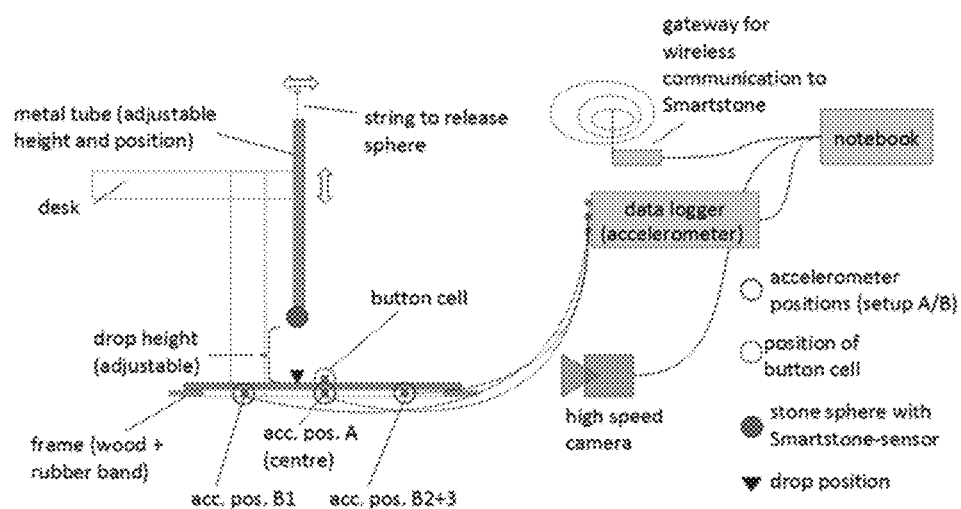
FIG. 6: shows a scheme side view of the device of the present invention.
Figure 7:
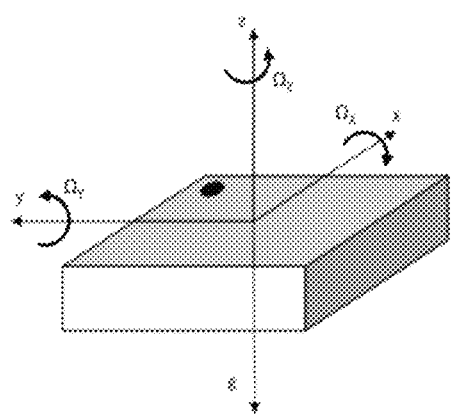
FIG. 7: shows a 3 axial inertial measurement unit (Bosch BMI 160): accelerometer: +/−16 g; gyroscope: 2000°/s.
Figure 8:
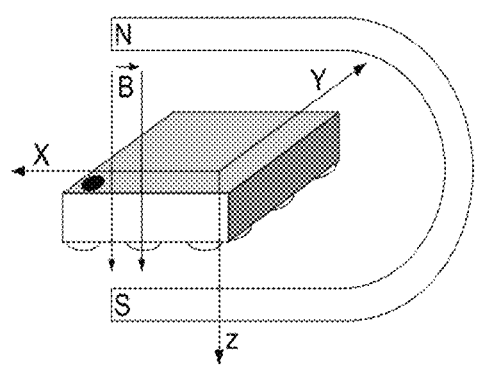
FIG. 8: shows a 3 axial geomagnetic sensor (Bosch BMM 150): accelerometer: +/−1300 microT. Sampling: up to 100 Hz (10× internal oversampling).
Figure 9:
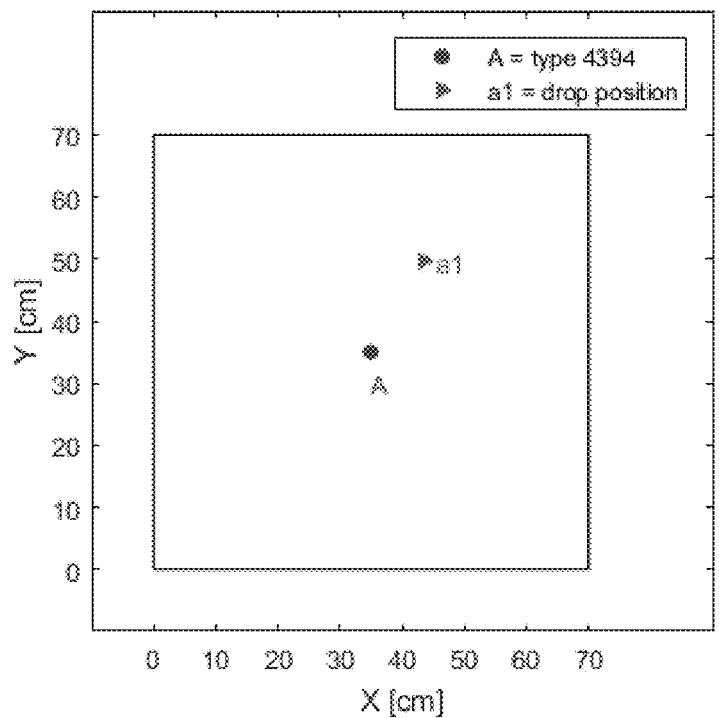
FIG. 9: shows a test with different drop heights in the air. Sensor and test setup: smartstone in stone sphere (100 Hz), one accelerometer in the centre of the plate (A), 125 kHz, a high speed camera (6500 fps), one drop position (a1) (43.5; 49.7), heights: 3 and 5 and 7 cm.
Figure 10:
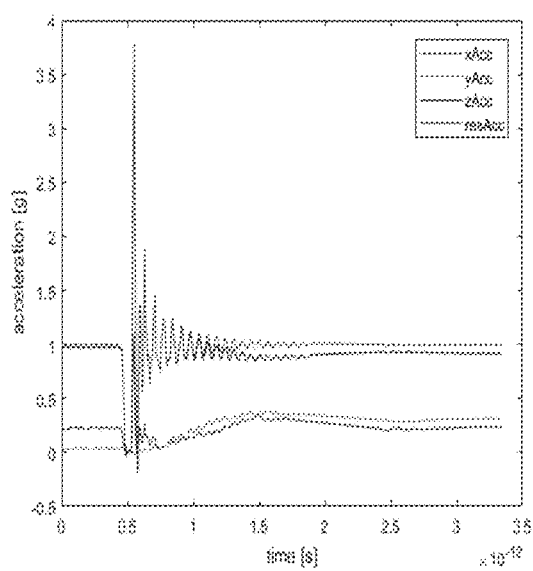
FIG. 10: shows raw smartstone acceleration data (exp. 34, 3 cm, sensor 111).
Figure 11:
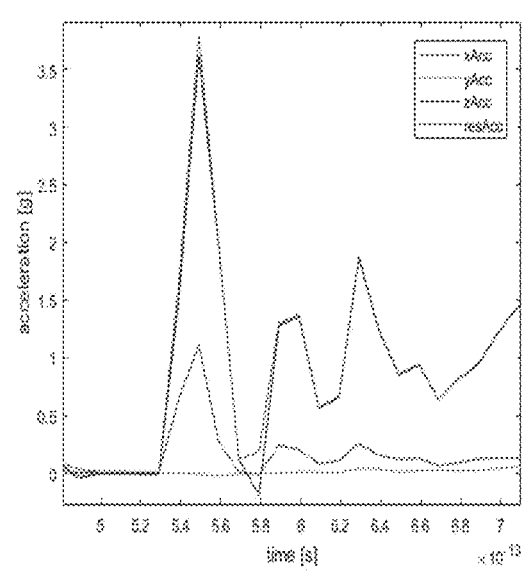
FIG. 11: shows also raw smartstone acceleration data (exp. 34, 3 cm, sensor 111).
Figure 12:
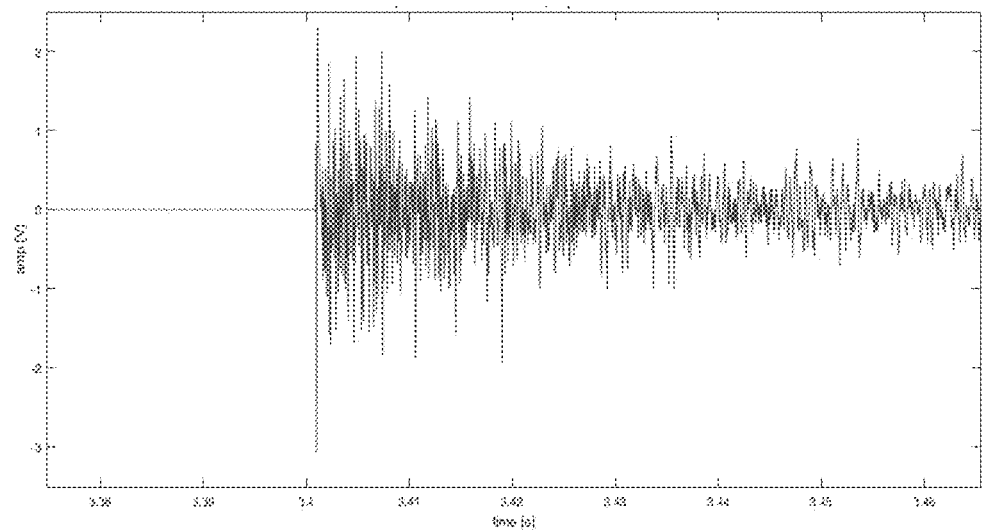
FIG. 12: shows raw accelerometer data (exp. 34, 3 cm, sensor type 4394).
Figure 13:
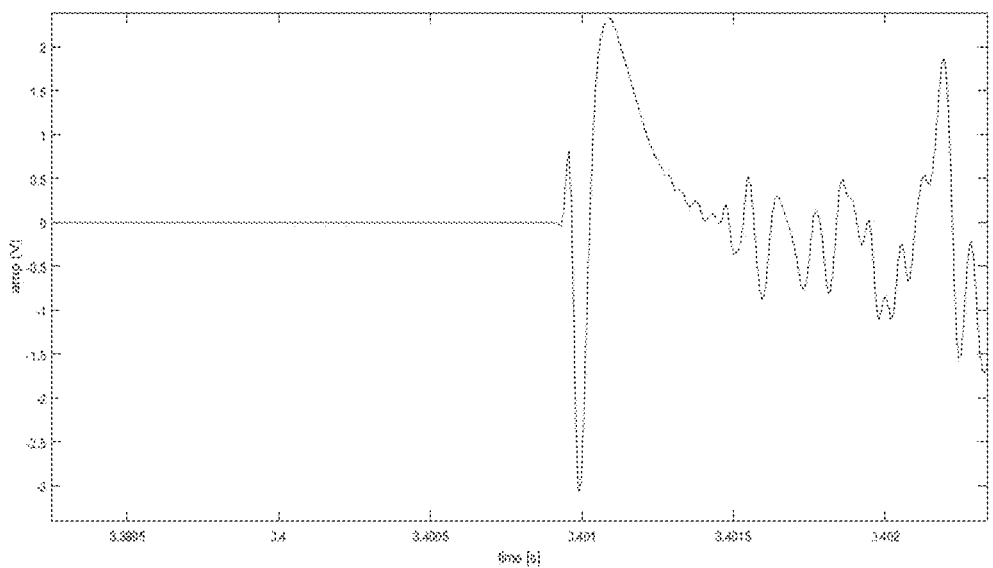
FIG. 13: shows raw accelerometer data (exp. 34, 3 cm, sensor type 4394).

Detailed Description of the Working Embodiment of FIG. 1

The moving objects (3A,3B) are projected or are moved through a vacuum or a fluid which can be a gas (e.g. air) or a liquid (e.g. water) before hitting an impact plate (5) placed in the respective vacuum or fluid.

The moving object (3A) is called a smart object because a first radio-frequency identification transmitter with antenna (1A) is embedded into the first sensor (1), which itself is embedded into the first moving object (3A). A blind hole is first pierced/drilled (depending on the material of the object) into the object and the first sensor (1) is placed inside the hole which is then sealed by any appropriate material (e.g. silicon) in order to avoid the loss of the sensor during the moving of the smart object (3A).

During the projection/moving of the smart object (3A) through a vacuum or fluid (gas-gas or gas-liquid or liquid-gas or liquid-liquid), and before hitting the impact plate (5) located in the same vacuum or fluid (gas-gas or liquid-liquid) or different fluid (gas-liquid or liquid-gas), the first sensor (1) sends via the antenna (1A) data to the first means (6) (e.g. spin and trajectory/course of the object).

When the moving object (3A) is hitting the impact plate (5), at least one time, or is rolling on the impact plate (5) the second sensor(s) (2A,2B,2C) send(s) data to the first means (6) (e.g. number of impacts of the first object (3A) on the plate (5), the frequency and force of the impacts, the form of the first object (3A), the type of movement of the first object (3A,3B), the spin the first object (3A,3B)). All second sensors (2A,2B,2C) are connected to the first means (6) via an electrical cable. The second sensors (2A,2B,2C) can also be linked one to the other via an electrical cable.

The first means (6) is collecting all data, it attributes a common time stamp to the different types of data, and sends them to the second means (7) which analyses the data provided by the first sensor (1) and the second sensor(s) (2A,2B,2C).

A computer program makes the analysis and permits to calibrate the second sensor(s) (2A,2B,2C), placed underneath the impact plate (5), for further measurements of the moving objects (3B) in relevant processes.

The term "calibration" means the act of comparison of a calibration database—created with the help of smart objects on the second means (7)—with signals from the impacts of moving objects (3B) without internal sensor after the calibration phase. One collects a database on the second means (7) where signals registered by the second sensors (2A,2B,2C) are arranged for each first impact by a smart object (3A). The core of the matching pursuit algorithm is to decompose the first impact signal into a set of functions (so-called dictionary). For the FAAD (First Arrival Atomic Decomposition) method and impact plate signals, we chose a very complex dictionary (7D-chirplet) to get the better approximation of the signal in a minimum number of iteration. FAAD allows determining the impact signal properties (amplitude, frequency). These smart object hitting signals (amplitude and central frequency of first impact 7D chirplet) from the second sensors (2A,2B,2C) are stored in the second means (7) in addition to the corresponding information for each signal on speed of the object, location of impact of the object, mass of the object, spin of the object. This spectra database with the additional information from the smart object (3A) is the calibration database. Moving objects (3A and 3B) are used to assess this additional information linked to the second sensors (2A,2B,2C) spectra. Once this database is available it is possible to assess each impact of any object by a simple look-up correlation with the database of calibrated impact.

In addition to this calibration we get further information on the process of the assessment of production lines by impact sensors. We get the information if single particles hit the plate only once or more often. This information can only be extracted from the smart sensor assessment. It is important to know because we than know how often objects are double counted in the production process and one can estimate a correction factor to this end. This is the second type of calibration, the assessment and correction of double or multiple hits.

The third type of calibration is the knowledge gain from the point of impact localisation.

The detection of the first arrival at the accelerometer is difficult for large distances (10 cm and 20 cm) because the first event is of low amplitude and mixed with later arrivals resulting from 50 rebounds of the moving objects (3A,3B) on. In this context the way the object (3A,3B) takes towards the plate is important. It gives us the exact location of the point of impact onto the plate "before" the object hits the plate. So the analysing software of the 7D Chirplet (second means (7)) knows the point of impact in advance and can focus on the analysis of the nearest accelerometer and including the information about the distance between the point of impact and the accelerometer.

It is necessary to use the high speed camera in parallel. The high speed camera is needed to assess the vibrations and deformations of the metal plate due to the impact by the object, to describe the type of impact and to explain the smart objects gravity forces. It is essential that the high speed camera is configured to assess the parameters due to the impacts of the first and second moving objects (e.g. the vibrations and deformations) on the impact plate (5). So for the patent the high speed camera is a vital device for the calibration.

Possible Industrial/Commercial Uses:

The device and process of the present invention can be designed and manufactured to meet specific requirements of production lines.

Each production line where objects of a certain size are registered or assessed by impact sensors can be improved. If we have the possibility to make an object smart (by implanting a special sensor) we can improve the calibration of the relevant existing impact sensor and the production processes therewith.

A big and growing market exists.

Note that the smart objects might preferably not be cereal grains (because cereal grains might be too small to make them smart with implanted sensors). The smart moving objects (3A) of the present invention are preferably not in the millimetre range but they are in the centimetre range (at least 2 cm height and 2 cm width). Non limiting examples are potatoes, tomatoes, apples, oranges, balls, pharmaceuticals). The limiting factor is the size of the board where the BOSCH sensor, battery, storage and antenna are located.

The present invention is not limited to the agricultural field. It can also be used in the medical field and sport field.

The term "comprising" or "comprises" used in the claims should not be interpreted as being restricted to the means listed thereafter. It does not exclude other elements or steps. It needs to be interpreted as specifying the presence of the stated features, integers, steps or components as referred to but does not preclude the presence or addition of one or more other features, integers, steps or components, or groups thereof. Thus, the scope of an expression "a device comprising means A and B" should not be limited to devices consisting only of components A and B.

It is appreciated that the features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. Any feature of an embodiment disclosed in the present invention can be combined with any other feature mentioned in the present invention.

The invention claimed is:

1. A calibration device comprising:
   at least one impact plate,
   wherein the calibration device also comprises:
   at least one first sensor embedded into a first moving object, said first sensor measuring the position, velocity, type of movement and impact strength directly in the first moving object hitting the impact plate, said type of movement being selected among rolling, sliding, jumping, hitting the plate,
   at least one second moving object,
   at least a first radio-frequency identification transmitter with antenna embedded into the first sensor,
   at least one second sensor attached directly underneath the plate for determining characteristics of the first moving object, when hitting the impact plate,
   at least one first means for receiving first data provided by the first sensor, before and while hitting the impact plate, and for receiving second data provided by the second sensor, when hitting the impact plate,
   at least a second radio-frequency identification transmitter with antenna embedded into the first means,
   the first sensor and the second sensor are interacting with the first means,
   at least one second means for analysing the data provided by the first sensor and by the second sensor and for calibrating the second sensor located on the impact plate and determining the characteristics of at least one second moving object when hitting the impact plate,
   a high speed camera is configured to assess parameters due to the impacts of the first and second moving objects on the impact plate.

2. The device according to the previous claim 1, wherein the characteristics of the first sensor are chosen among determining the number of impacts of the first object on the plate, determining the frequency and the force of the impacts of the first object on the plate, determining the type of movement of the first object, and determining the spin of the first object.

3. The device according to the previous claim 1, wherein the second sensor is arranged in a triangular pattern.

4. The device according to the previous claim 1, wherein the first sensor is a 9-axis sensor.

5. The device according to the previous claim 1, wherein the first moving object is pre-weighed.

6. The device according to the previous claim 1, wherein the first and/or second moving object is selected from a first family being vegetables or the object is selected from a second family being fruits or the object is selected from a third family being balls, or the object is selected from a fourth family being medicaments.

7. The device according to the previous claim 1, wherein the first and/or second moving object has a cubic, cuboid, spherical, cylindrical, conical, triangular prism, hexagonal prism triangular-based pyramidal, square based pyramidal, hexagonal pyramidal shape.

8. The device according to the previous claim 1, wherein the first and/or second object has a height and a diameter of at least 2 cm.

9. The device according to the previous claim 1, wherein the impact plate is flat, has a smooth surface and has a triangular, square, rectangular, rhombus, parallelogram, trapezoidal, kite, pentagonal, hexagonal, heptagonal, octagonal, nonagonal, decagonal, circular, elliptical, crescental, pipe, half-pipe shape.

10. The device according to the previous claim 1, wherein the first means is a data logger.

11. The device according to the previous claim 1, wherein the second means is a wave-flat analysis dictionary based on multiscale swept frequency wave packets of various shape and duration.

12. The device according to the previous claim 11, wherein the wave-flat analysis dictionary is a 7D-chirp atom.

13. The device according to the previous claim 1, wherein the plate is entirely made of a metallic or a ceramic material or a graphene material.

14. A calibration method comprising the following successive steps:
embedding at least one first sensor into a first moving object, said first sensor measuring the position, velocity, type-form of movement and impact strength directly in the first moving object hitting the impact plate, said type of movement being selected among rolling, sliding, jumping, hitting the plate,
incorporating at least one second moving object,
fixing at least one second sensor directly underneath an impact plate,
determining a first data provided by the first moving object, before and while hitting the plate, via the first sensor,
determining a second data provided by the first moving object, when hitting the plate, via the second sensor,
receiving the first data and the second data by at least one first means,
analysing the data provided by the first sensor and by the second sensor via a second means,
calibrating the second sensor located on the impact plate,
determining the characteristics of said at least one second moving object when hitting the impact plate,
assessing parameters due to the impacts of the first and second moving objects on the impact plate by a high speed camera-.

15. A non-transitory computer readable medium having stored thereon instructions of a computer program for implementing the method according to the previous claim 14 when said instructions are executed by a processor, said non-transitory computer readable medium being embedded into the second means, said second means being configured for analysing the first data provided by the first sensor and the second data provided by the second sensor in order to calibrate the second sensor of the impact plate and the second means being further configured for determining the characteristics of the second moving object when hitting the impact plate.

* * * * *